(12) United States Patent
Galles et al.

(10) Patent No.: US 11,249,805 B2
(45) Date of Patent: Feb. 15, 2022

(54) METHODS AND SYSTEMS FOR HARDWARE-BASED MEMORY RESOURCE ALLOCATION

(71) Applicant: Pensando Systems Inc., Milpitas, CA (US)

(72) Inventors: Michael B. Galles, Los Altos, CA (US); Alessandro Fulli, Los Gatos, CA (US); Sameer Kittur Subrahmanya, Fremont, CA (US)

(73) Assignee: Pensando Systems, Inc., Milpitas, CA (US)

( * ) Notice: Subject to any disclaimer, the term of this patent is extended or adjusted under 35 U.S.C. 154(b) by 44 days.

(21) Appl. No.: 16/883,517

(22) Filed: May 26, 2020

(65) Prior Publication Data

US 2021/0373955 A1     Dec. 2, 2021

(51) Int. Cl.
| | |
|---|---|
| *G06F 9/46* | (2006.01) |
| *G06F 9/50* | (2006.01) |
| *G06F 9/54* | (2006.01) |
| *G06F 12/02* | (2006.01) |
| *G06F 9/30* | (2018.01) |

(52) U.S. Cl.
CPC .......... *G06F 9/5016* (2013.01); *G06F 9/3013* (2013.01); *G06F 9/5022* (2013.01); *G06F 9/544* (2013.01); *G06F 12/023* (2013.01); *G06F 2209/5011* (2013.01)

(58) Field of Classification Search
CPC .... G06F 9/5016; G06F 9/3013; G06F 9/5022; G06F 9/544; G06F 12/023; G06F 2209/5011
See application file for complete search history.

(56) References Cited

U.S. PATENT DOCUMENTS

| | | |
|---|---|---|
| 7,035,988 B1 | 4/2006 | Marino |
| 9,262,554 B1 | 2/2016 | Bailey et al. |
| 2002/0057446 A1 | 5/2002 | Long et al. |
| 2007/0074014 A1 | 3/2007 | Musoll et al. |
| 2014/0241361 A1 | 8/2014 | Bosshart et al. |
| 2016/0216913 A1 | 7/2016 | Bosshart |
| 2019/0132198 A1 | 5/2019 | Li et al. |

(Continued)

OTHER PUBLICATIONS

Kanev, Svilen et al. "Mallace: Accelerating Memory Allocation", ASPLOS '17, Apr. 8-12, 2017, 13 pgs.

(Continued)

*Primary Examiner* — Gregory A Kessler
(74) *Attorney, Agent, or Firm* — Loza & Loza, LLP

(57) ABSTRACT

Methods and systems for memory resource allocation are disclosed. In an embodiment, a method for memory resource allocation involves reading a pool-specific configuration record from an array of memory mapped pool-specific configuration records according to a memory resource allocation request that is held in an address register of a memory mapped register interface, performing a memory resource allocation operation to service the memory resource allocation request, wherein performing the memory resource allocation operation involves interacting with a resource list according to a pointer in the pool-specific configuration record, advancing the pointer after the interaction, and updating the pointer in the pool-specific configuration record with the advanced pointer.

28 Claims, 17 Drawing Sheets

(56) References Cited

U.S. PATENT DOCUMENTS

| | | |
|---|---|---|
| 2019/0171604 A1 | 6/2019 | Brewer |
| 2019/0196982 A1* | 6/2019 | Rozas ................... G06F 12/145 |
| 2019/0347133 A1 | 11/2019 | Simmons et al. |
| 2020/0044931 A1 | 2/2020 | Boon |
| 2020/0065244 A1* | 2/2020 | Sanghi ................ G06F 13/1668 |

OTHER PUBLICATIONS

Kaufmann, Antoine et al. "High Performance Packet Processing with FlexNIC", ASPLOS '16, Apr. 2-6, 2016, 15 pgs.

Parson, Dale "Real-time Resource Allocators in Network Processors using FIFOs", Proceedings of Advanced Networking and Communications Hardware Workshop (ANCHOR) 2004, Munich, Germany, Jun. 19, 2004, 9 pgs.

Sonchack, John et al. "Scaling Hardware Accelerated Network Monitoring to Concurrent and Dynamic Queries With *Flow", Proceedings of the 2018 USENIX Annual Technical Conference, Jul. 11-13, 2018, Boston, MA, 14 pgs.

Vinkler, M. et al. "Register Efficient Memory Allocator for GPUs", The Eurographics Association 2014, 9 pgs.

Emmerich, Paul et al. "User Space Network Drivers", ANCS'19, Association for Computing Machinery, 14 pgs.

PCT/US2021/033506. International Search Report & Written Opinion (Aug. 24, 2021). 9 pages.

\* cited by examiner

METHODS AND SYSTEMS FOR HARDWARE-BASED MEMORY RESOURCE ALLOCATION

BACKGROUND

In data networks, input/output (I/O) systems such as switches, routers, and network interface cards receive packets at input interfaces, process the received packets, and then forward the packets to one or more output interfaces. It is important that such I/O systems operate as quickly as possible in order to keep pace with a high rate of incoming packets. Software written for input/output (I/O) device management often spends a significant amount of effort managing memory resources, which may include managing data buffers for network packets and storage blocks, buffers passed between processes (e.g., Linux MBUF), and memory descriptors used to define work units for device hardware. Buffer management tasks include buffer allocation, deallocation, and freelist management, buffer pool selection and prioritization, and resource list read pointer (head) and write pointer (tail) management. I/O applications that require high rates of buffer management operations can cause the CPU of an I/O system to spend too much time tracking buffers and memory resources, which can limit performance and leave fewer CPU cycles for higher level functions.

SUMMARY

Methods and systems for memory resource allocation are disclosed. In an embodiment, a method for memory resource allocation involves reading a pool-specific configuration record from an array of memory mapped pool-specific configuration records according to a memory resource allocation request that is held in an address register of a memory mapped register interface, performing a memory resource allocation operation to service the memory resource allocation request, wherein performing the memory resource allocation operation involves interacting with a resource list according to a pointer in the pool-specific configuration record, advancing the pointer after the interaction, and updating the pointer in the pool-specific configuration record with the advanced pointer.

In an embodiment, the array of memory mapped pool-specific configuration records is stored in hardware registers and wherein reading a pool-specific configuration record from the array of memory mapped pool-specific configuration records comprises generating a physical memory address in the hardware registers from a value in the address register of the memory mapped register interface.

In an embodiment, the array of memory mapped pool-specific configuration records is stored in random access memory (RAM), and reading a pool-specific configuration record from the array of memory mapped pool-specific configuration records involves generating a physical memory address in the RAM from a value in the address register of the memory mapped register interface.

In an embodiment, performing the memory resource allocation operation involves reading a memory buffer address from the resource list according to a read pointer in the pool-specific configuration record.

In an embodiment, performing the memory resource allocation operation involves writing a memory buffer address from a data register in the memory mapped register interface to the resource list according to a write pointer in the pool-specific configuration record.

In an embodiment, the pool-specific configuration record includes a base address of the resource list, a read pointer to the resource list, and a write pointer to the resource list.

In an embodiment, each pool-specific configuration record in the array of pool-specific configuration records identifies a resource list that defines a pool of memory buffers.

In an embodiment, the pool-specific configuration record includes a base address of the resource list, a read pointer to the resource list, a write pointer to the resource list, and at least one feature that is stored in a features field.

In an embodiment, performing a memory resource allocation operation involves performing a memory resource allocation operation selected from the available option of allocating a memory resource when the memory resource allocation request is a read request, wherein allocating a memory resource involves identifying a read pointer in the pool-specific configuration record, returning a memory resource address that is read from the resource list at a location that is specified by the read pointer, advancing the read pointer to a next node in the resource list, and updating the read pointer in the pool-specific configuration record with the advanced read pointer, and the available option of deallocating a memory resource when the memory resource allocation request is a write request, wherein the write request includes a memory resource address in a data register of the memory mapped register interface and deallocating a memory resource involves identifying a write pointer in the pool-specific configuration record, writing the memory resource address from the data register of the memory mapped register interface to the resource list at a location that is specified by the write pointer, advancing the write pointer to a next node in the resource list, and updating the write pointer in the pool-specific configuration record with the advanced write pointer.

In an embodiment, the memory resource allocation request is a read or write request that is held in the address register of the memory mapped register interface and the read or write request includes a read or write instruction, respectively, a resource identifier, and an offset and wherein the pool-specific configuration record is accessed using the read instruction, the resource identifier, and the offset.

In an embodiment, the offset has page resolution.

In an embodiment, the method involves using data in the offset to perform the memory resource allocation operation.

In an embodiment, reading a pool-specific configuration record involves reading a feature field from the pool-specific configuration record, and performing the memory resource allocation operation using the pool-specific configuration record involves performing the memory resource allocation operation in response to a value in the feature field.

In an embodiment, the method involves maintaining a count in memory that corresponds to the pool-specific configuration record, the memory resource allocation request is a write request, and further involving implementing the write request only when the count indicates that the memory resource is not allocated to any other entity.

In an embodiment, the method involves serially processing received memory resource allocation requests at the memory mapped register interface.

A system for memory resource allocation is also disclosed. The system includes an array of memory mapped pool-specific configuration records, RAM that stores resource lists that correspond to the pool-specific configuration records and that define pools of memory buffers, and a memory mapped register interface configured to receive a memory resource allocation request, read a pool-specific configuration record in the array of memory mapped pool-specific configuration records according to the memory resource allocation request, perform a memory resource allocation operation to service the memory resource allocation request, wherein performing the memory resource allocation operation involves interacting with a resource list according to a pointer in the pool-specific configuration record, advance the pointer after the interaction, and update the pointer in the pool-specific configuration record with the advanced pointer.

In an embodiment, the array of memory mapped pool-specific configuration records are stored in hardware registers and the memory mapped register interface includes an address register configured to receive a component of the memory resource allocation request and the memory mapped register interface is configured to generate a physical memory address in the hardware registers from a value in the address register in order to read the pool-specific configuration record from the hardware registers.

In an embodiment, the array of memory mapped pool-specific configuration records are stored in RAM and the memory mapped register interface includes an address register configured to receive a component of the memory resource allocation request and the memory mapped register interface is configured to generate a physical memory address in the RAM from a value in the address register in order to read the pool-specific configuration record from the RAM.

In an embodiment, the memory mapped register interface includes a data register configured to receive another component of the memory resource allocation request and wherein the memory mapped register interface is configured to perform the memory resource allocation operation by writing a memory buffer address from the data register in the memory mapped register interface to the resource list according to a write pointer in the pool-specific configuration record.

In an embodiment, the pool-specific configuration records include a base address of the resource list, a read pointer to the resource list, and a write pointer to the resource list.

In an embodiment, the pool-specific configuration records include a base address of the resource list, a read pointer to the resource list, a write pointer to the resource list, and at least one feature associated with the pool of memory buffers.

In an embodiment, the memory mapped register interface includes an address register to hold an address component of a memory resource allocation request, a data register to hold a data component of the memory resource allocation request and allocator logic configured to allocate a memory resource when the memory resource allocation request is a read request by reading a pool-specific configuration record in the array of memory mapped pool-specific configuration records according to an address in the address register, returning a memory resource address that is read from the resource list at a location that is specified by the pointer, which is a read pointer, advancing the read pointer to a next node in the resource list, and updating the read pointer in the pool-specific configuration record with the advanced read pointer, and deallocate a memory resource when the memory resource allocation request is a write request by reading a pool-specific configuration record in the array of memory mapped pool-specific configuration records according to an address in the address register, writing a memory resource address, which is held in the data register, to the resource list at a location that is specified by the pointer, which is a write pointer, advancing the write pointer to a next node in the resource list, and updating the write pointer in the pool-specific configuration record with the advanced write pointer.

In an embodiment, reading a pool-specific configuration record involves reading a feature field from the pool-specific configuration record and performing the memory resource allocation operation using the pool-specific configuration record involves performing the memory resource allocation operation in response to a value in the feature field.

In an embodiment, the system further comprises a count that is maintained in memory and that corresponds to the pool-specific configuration record, wherein the memory resource allocation request is a write request, and wherein the memory mapped register interface is further configured to implement the write request only when the count indicates that the memory resource is not allocated to any other entity.

In an embodiment, the memory mapped register interface is configured to serially process received memory resource allocation requests.

Another system for memory resource allocation is disclosed. The system includes RAM that stores an array of memory mapped pool-specific configuration records and resource lists that correspond to the pool-specific configuration records and that each define a pool of memory buffers, and a memory mapped register interface that includes an address register and a data register to receive a memory resource allocation request, and allocator logic configured to read a pool-specific configuration record in the array of memory mapped pool-specific configuration records according to a value in the address register, perform a memory resource allocation operation to service the memory resource allocation request, wherein performing the memory resource allocation operation involves interacting with a resource list according to a pointer in the pool-specific configuration record, advance the pointer after the interaction, and update the pointer in the pool-specific configuration record that is stored in the RAM with the advanced pointer.

In an embodiment, the memory mapped register interface includes an address register configured to receive a component of the memory resource allocation request and wherein the memory mapped register interface is configured to generate a physical memory address in the RAM from a value in the address register in order to read the pool-specific configuration record from the RAM.

In an embodiment, the allocator logic is configured to allocate a memory resource when the memory resource allocation request is a read request by returning a memory resource address that is read from the resource list at a location that is specified by the pointer, which is a read pointer, advancing the read pointer to a next node in the resource list, and updating the read pointer in the pool-specific configuration record that is stored in the RAM with the advanced read pointer, and deallocate a memory resource when the memory resource allocation request is a write request by writing a memory resource address from the data register to the resource list at a location that is specified by the pointer, which is a write pointer, advancing the write pointer to a next node in the resource list, and updating the write pointer in the pool-specific configuration record that is stored in the RAM with the advanced write pointer.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 6A illustrates an example data exchange that is involved in a write operation between.

Throughout the description, similar reference numbers may be used to identify similar elements.

DETAILED DESCRIPTION

Figure 1:
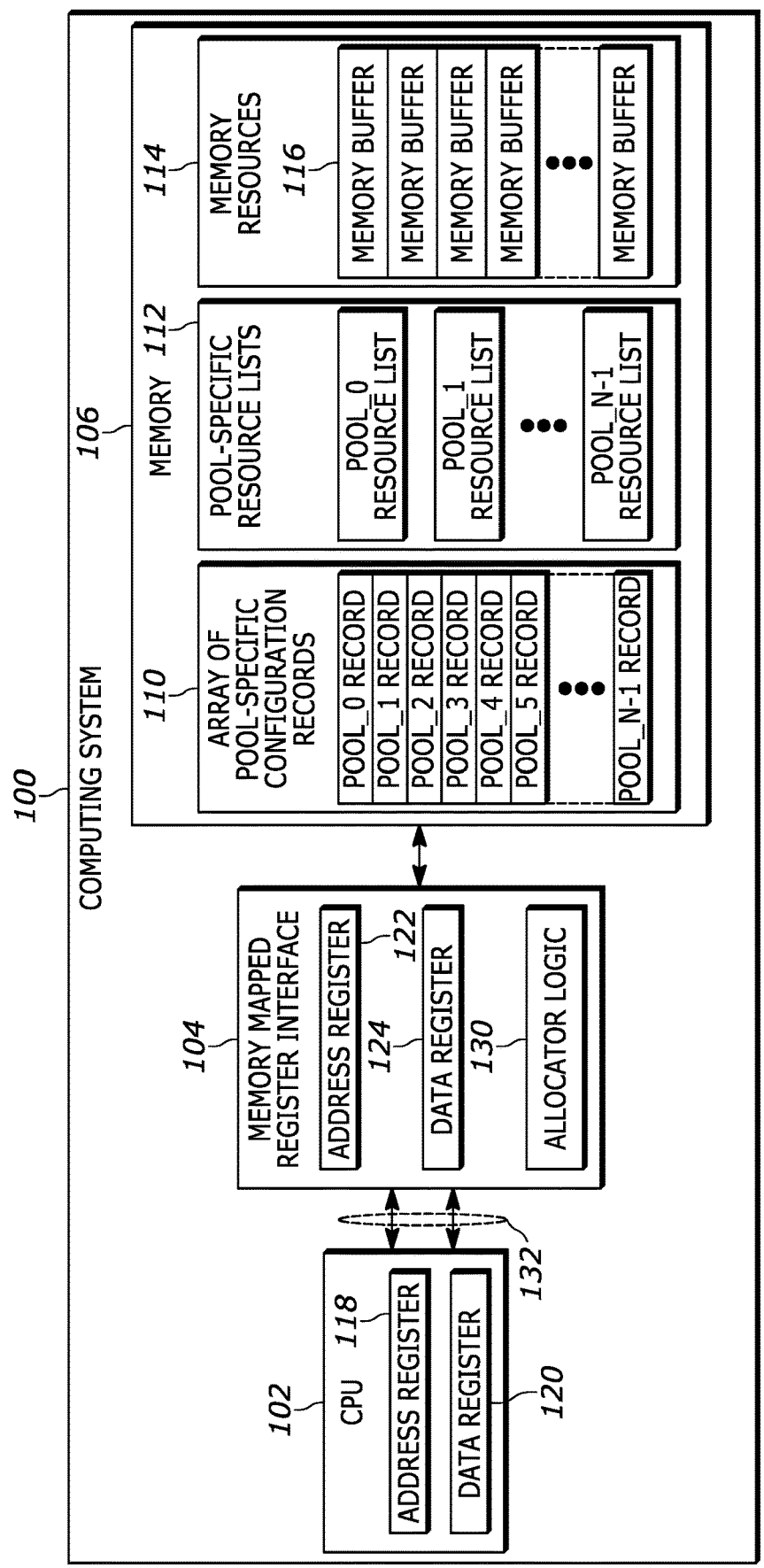
FIG. 1 depicts an example of a computing system that is configured to implement hardware-based memory resource allocation in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In accordance with an embodiment of the invention, a technique for memory resource allocation utilizes a memory mapped register interface and an array of memory mapped pool-specific configuration records that is stored in either hardware registers or RAM to implement hardware-based memory resource allocation that is both highly flexible and massively scalable (e.g., when stored in RAM) while conserving CPU cycles as compared to typical software-based resource allocation systems. In particular, a method for memory resource allocation involves reading a pool-specific configuration record from an array of memory mapped pool-specific configuration records, performing a memory resource allocation operation to service the memory resource allocation request, wherein performing the memory resource allocation operation involves interacting with a resource list according to a pointer in the pool-specific configuration record, advancing the pointer after the interaction, and updating the pointer in the pool-specific configuration record with the advanced pointer. In one embodiment, the array of memory mapped pool-specific configuration records is stored in hardware registers and in another embodiment, the array of memory mapped pool-specific configuration records is stored in RAM. In an embodiment, reading a pool-specific configuration record from hardware registers involves generating a hardware register address from a value in the address register of the memory mapped register interface and in another embodiment, reading a pool-specific configuration record from the RAM involves generating a physical memory address in the RAM from a value in the address register of the memory mapped register interface. In an embodiment, performing the memory resource allocation operation involves reading a memory buffer address from the resource list according to a read pointer in the pool-specific configuration record and in another embodiment, performing the memory resource allocation operation involves writing a memory buffer address from a data register in the memory mapped register interface to the resource list according to a write pointer in the pool-specific configuration record. In an embodiment, each pool-specific configuration record in the array of pool-specific configuration records identifies a resource list that defines a pool of memory buffers. For example, each pool-specific configuration record includes a base address of a corresponding resource list, a read pointer to the resource list, a write pointer to the resource list, and features that are associated with the pool of memory buffers.

Memory resource allocation requests come in the form of read requests, which are requests to allocate a memory buffer to an entity, and write requests, which are requests to deallocate (or free) a memory buffer from an entity. Processing a read request involves identifying a read pointer in the pool-specific configuration record, returning a memory resource address that is read from the resource list at a location that is specified by the read pointer, advancing the read pointer to a next node in the resource list, and updating the read pointer in the pool-specific configuration record with the advanced read pointer. Processing a write request involves identifying a write pointer in the pool-specific configuration record, writing a memory resource address from a data register of the memory mapped register interface to the resource list at a location that is specified by the write pointer, advancing the write pointer to a next node in the resource list, and updating the write pointer in the pool-specific configuration record with the advanced write pointer.

Because the array of pool-specific configuration records is accessed through a memory mapped register interface, the memory resource allocation process does not consume CPU resources and when the pool-specific configuration records are maintained in RAM, a large number of memory buffer pools can be uniquely managed, with a wide range of feature availability. Additionally, because the memory mapped register interface provides a hardware circuit at which resource allocation requests (e.g., read/write requests) are processed, the memory buffers can be shared amongst many entities without the need for a shared memory lock.

FIG. 1 depicts an example of a computing system 100 that is configured to implement hardware-based memory resource allocation in accordance with an embodiment of the invention. As depicted in FIG. 1, the computing system includes a CPU 102, a memory mapped register interface 104, and memory 106 (e.g., RAM) that stores an array of pool-specific configuration records 110 and pool-specific resource lists 112, and in which memory resources 114 in the form of memory buffers 116, e.g., 4K memory buffers, are defined.

In an embodiment, the computing system 100 is a component of an input/output (I/O) device, such as a network interface card (NIC), although the computing system may be a component of some other device or a component of a broader computing system. In an embodiment, elements of the computing system are integrated onto the same IC device, e.g., such as a "system-on-chip" or "SoC." In other embodiments, some elements of the computing system are connected to each other on a printed circuit board (PCB). In an embodiment, the CPU 102 is a general purpose processor core, such as an ARM processor core, a Microprocessor without Interlocked Pipeline Stages (MIPS) processor core, and/or an x86 processor core, as is known in the field. In an embodiment, the CPU is a Reduced Instruction Set Computers (RISC) CPU that is programmable using a general purpose programming language such as C and in another embodiment, the CPU is a domain-specific processor configured specifically for network data processing. Although not shown in FIG. 1, a CPU typically includes a memory interface, an ALU, a register bank, an instruction fetch unit, and an instruction decoder, which are configured to execute instructions. The CPU may also include internal registers that can only be used by the CPU (e.g., instruction registers, memory address registers, and memory buffer registers) and user-accessible registers such as address registers and data registers that can be used by external components and/or software as is known in the field. A user-accessible address register 118 and a user-accessible data register 120 of the CPU are shown in FIG. 1. Although only a single CPU is shown in FIG. 1, the computing system may include more than one CPU that has access to the memory mapped register interface and to the memory.

The memory mapped register interface 104 is configured to implement operations related to memory resource allocation as is described below. The memory mapped register interface includes an address register 122, a data register 124, and allocator logic 130. In an embodiment, the memory mapped register interface is integrated onto the same IC device as the CPU 102 and the address register 122 and data register 124 are used to hold components of memory resource allocation requests. For example, with regard to read requests the address register 122 holds a pool identifier and the data register 124 holds the address of a memory buffer that is returned as a result of a read operation and with regard to write requests, the address register 122 holds a pool identifier and the data register 124 holds the address of a memory buffer that is to be written to a corresponding resource list as a result of a write operation. In an embodiment, the address and data registers, 122 and 124, are 64-bit hardware registers that are implemented in hardware circuits such as flip-flop circuits as is known in the field. Although the address and data registers are described as 64-bit registers, the address and data registers could be of a different size, such as, for example, 32-bit registers. In an embodiment, the address and data registers of the memory mapped register interface are embodied as a small amount of fast storage that is external to the CPU and that is distinct from the user-accessible address and data registers 118 and 120, which are incorporated into the CPU, e.g., as part of an intellectual property (IP) block that is often provided by third-party CPU providers. Although not shown in FIG. 1, the memory mapped register interface may include a first set of address and data registers for receiving memory resource allocation requests from the CPU and a second set of address and data registers for returning information related to read requests (e.g., the read memory buffer address) and write requests (e.g., a write response). The memory mapped register interface may include additional registers to accommodate processing of multiple memory resource allocations requests at the same time, e.g., in a pipeline process.

In an embodiment, the address and data registers 122 and 124 of the memory mapped register interface 104 are connected to the corresponding address and data registers, 118 and 120, within the CPU 102 via a bus 132 (e.g., an on-chip bus). In an embodiment, the bus may be implemented as a "network-on-chip" or "NoC" as is known in the field. In an embodiment, the bus may conform to a bus specification such as the ARM Advanced Microcontroller Bus Architecture (AMBA), and may utilizes AMBA protocol specifications such as, for example, Advanced eXtensible Interface (AXI), Advanced High-performance Bus (AHB), and/or Advanced Peripheral Bus (APB). In an embodiment, a network-on-chip that interconnects the CPU and the memory mapped register interface includes circuits that steer memory resource allocation requests from the CPU to the memory mapped register interface based on an address in the memory resource allocation requests.

In an embodiment, the allocator logic 130 is implemented in hardware circuits that interact with the address register 122 and the data register 124 and with data from the array of pool-specific configuration records 110 and from the pool-specific resource lists 112 that are stored in memory 106 (e.g., RAM) to service memory resource allocation requests from the CPU 102. For example, the allocator logic includes hardware circuits configured to implement finite state machines (FSMs) that perform memory resource allocation operations that include reading pool-specific configuration records from the array of pool-specific configuration records and then reading from or writing to the corresponding pool-specific resource lists depending on whether the memory resource allocation request is an allocation request, which involves a read operation, or a deallocation request, which involves a write operation. In an embodiment, the allocator logic is implemented as a pipeline machine, with a stage for decoding the resource allocation requests, a stage for issuing reads of the pool-specific configuration records, a stage for issuing reads of the resource lists, and a stage for returning read/write responses.

Operations of the memory mapped register interface 104 are described in more detail below with reference to FIGS. 5A-8B.

Turning now to the memory 106 of the computing system 100, in an embodiment, the memory is RAM. For example, the memory may be static RAM (SRAM), dynamic RAM (DRAM), synchronous DRAM (SDRAM), double-data rate SDRAM (DDR-SDRAM or simply DDR), or a combination thereof. Although the memory is shown as a single element in FIG. 1, it should be understood that the memory may include different types of memory. The memory may be a combination of different memory elements and the different memory elements may be integrated onto the same IC device as the CPU 102 and the memory mapped register interface 104, or some memory elements may be integrated onto the same IC device as the CPU and the memory mapped register interface while other memory elements are on different IC devices. In an embodiment, the CPU, the memory mapped register interface, and the memory are integrated onto a single IC device, such as an SoC, and the memory includes DDR.

As illustrated in FIG. 1, the memory 106 stores the array of pool-specific configuration records 110 and the pool-specific resource lists 112 and the memory includes memory resources 114, e.g., segments of memory that are individually defined as "memory buffers" 116. The array of pool-specific configuration records includes individual pool-specific configuration records that are memory mapped as described in more detail below. The pool-specific resource lists are resource lists that correspond to particular pool-specific configuration records and that identify particular memory resources, e.g., in the form of memory buffer addresses, which define a pool of memory buffers. As is described in more detail below with reference to FIGS. 4A and 4B, a pool-specific resource list includes a list of nodes in which each node includes, at a minimum, an identifier/pointer to a particular memory resource, e.g., a memory buffer address that corresponds to a physical address in memory of a particular memory buffer. The resource lists may be in the form of, for example, arrays or linked lists and the nodes of the pool-specific resource lists may include additional information about the corresponding memory buffer, such as, for example, statistics about the memory buffer, information about an entity that allocated the memory buffer or that the memory buffer is allocated to, and whether or not the memory buffer has any lock conditions. Such features may be stored individually in each node of a resource list in a flag field or flag fields and are referred to herein generally as "flag(s)" to indicate that there may be one or more flag fields associated with a node of a resource list.

In an embodiment, the memory resources 114 are elements of memory that are used to temporarily store, or buffer, data in the computing system. As depicted in FIG. 1, the memory resources are divided into memory buffers 116. For example, the memory resources are divided into fixed-sized blocks of contiguous memory cells of, for example, 4 KB each, which is a common buffer size in the field because the 4 KB memory buffers correspond to 4 KB memory pages or virtual pages that are used by many computing systems.

Figure 2A:
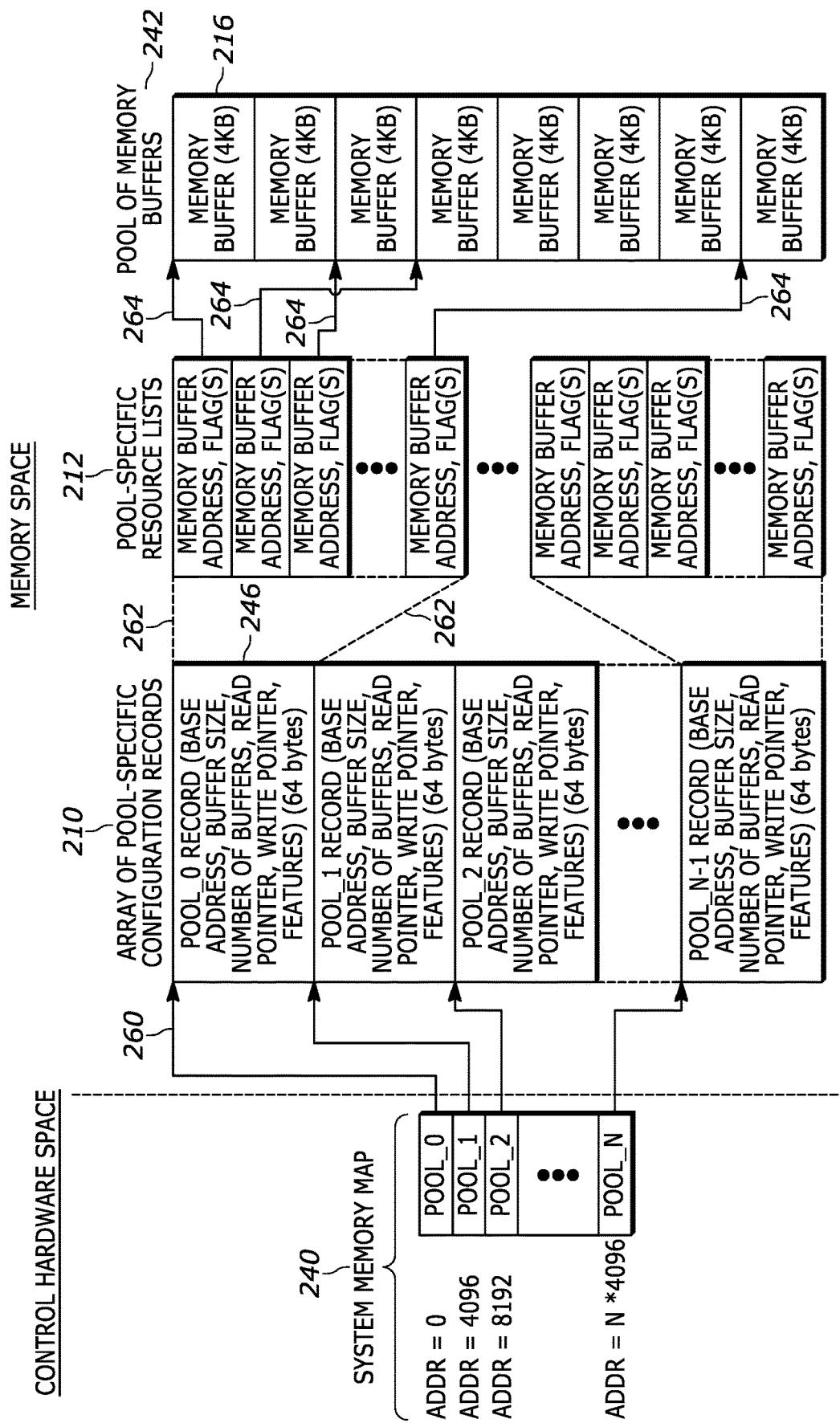
FIG. 2A illustrates the relationship between a system memory map, an array of memory mapped pool-specific configuration records, pool-specific resource lists, and a pool of memory buffers, in which the array of memory mapped pool-specific configuration records is stored in memory space, e.g., in RAM.

FIG. 2A illustrates the relationship between a system memory map 240, an array of memory mapped pool-specific configuration records 210, pool-specific resource lists 212, and a pool of memory buffers 242, in which the array of memory mapped pool-specific configuration records is stored in memory space, e.g., in RAM. As illustrated in FIG. 2A, the system memory map is represented in a control hardware space and the array of pool-specific configuration records, the pool-specific resource lists, and memory buffers 216 of the pool of memory buffers are represented in a memory space. On the left side of FIG. 2A in the control hardware space, the system memory map includes a page table of addresses, e.g., addresses within the configuration register space provided as binary values, which correspond to physical memory addresses in the memory space and ultimately to specific pools of memory buffers. In particular, the addresses are separated by 4 KB (4096) each. In binary, the separation of pages by 4 KB is implemented with a 12-bit offset. As illustrated in FIG. 2A, there are N distinct addresses in the address space and in at least one example, $N=2^{24}=16M$ distinct addresses in the address space. In an embodiment, each distinct address (also referred to as a "pool identifier" or "resource identifier") corresponds to a pool of buffers in that each distinct address is mapped to a particular physical memory address in the memory. For example, as shown in FIG. 2A, address, addr=0, corresponds to pool_0, and pool_0 is mapped to a physical memory address at which the record for pool_0 is stored. Likewise, address, addr=4096, corresponds to pool 1, and pool_1 is mapped to a physical memory address at which the record for pool_1 is stored, address, addr=8192, corresponds to pool_2, and pool_2 is mapped to a physical memory address at which the record for pool_2 is stored, and address, addr=N*4096, corresponds to pool_N−1, and pool_N−1 is mapped to a physical memory address at which the record for pool_N−1 is stored. In an embodiment, the mapping from an address in the address space to a physical memory address in the memory space is a function of a base address, a pool number, and an offset between pool-specific configuration records. In the example of FIG. 2A, each pool-specific configuration record is allotted 64 bytes in RAM and the physical memory address of each pool-specific configuration record can be determined from the base address (e.g., addr=0) as, base address+pool_number*64 bytes. Although the addresses in the address space start at "adder=0," it should be understood that in an actual computing system, the addresses for pools of memory buffers will likely be further along in the address space. In the case where the pool-specific configuration records are stored in the memory space, e.g., in RAM, the number of different records that can be practically stored on, for example, an SoC is much higher than pool-specific configuration records that are stored in hardware registers.

Figure 2B:
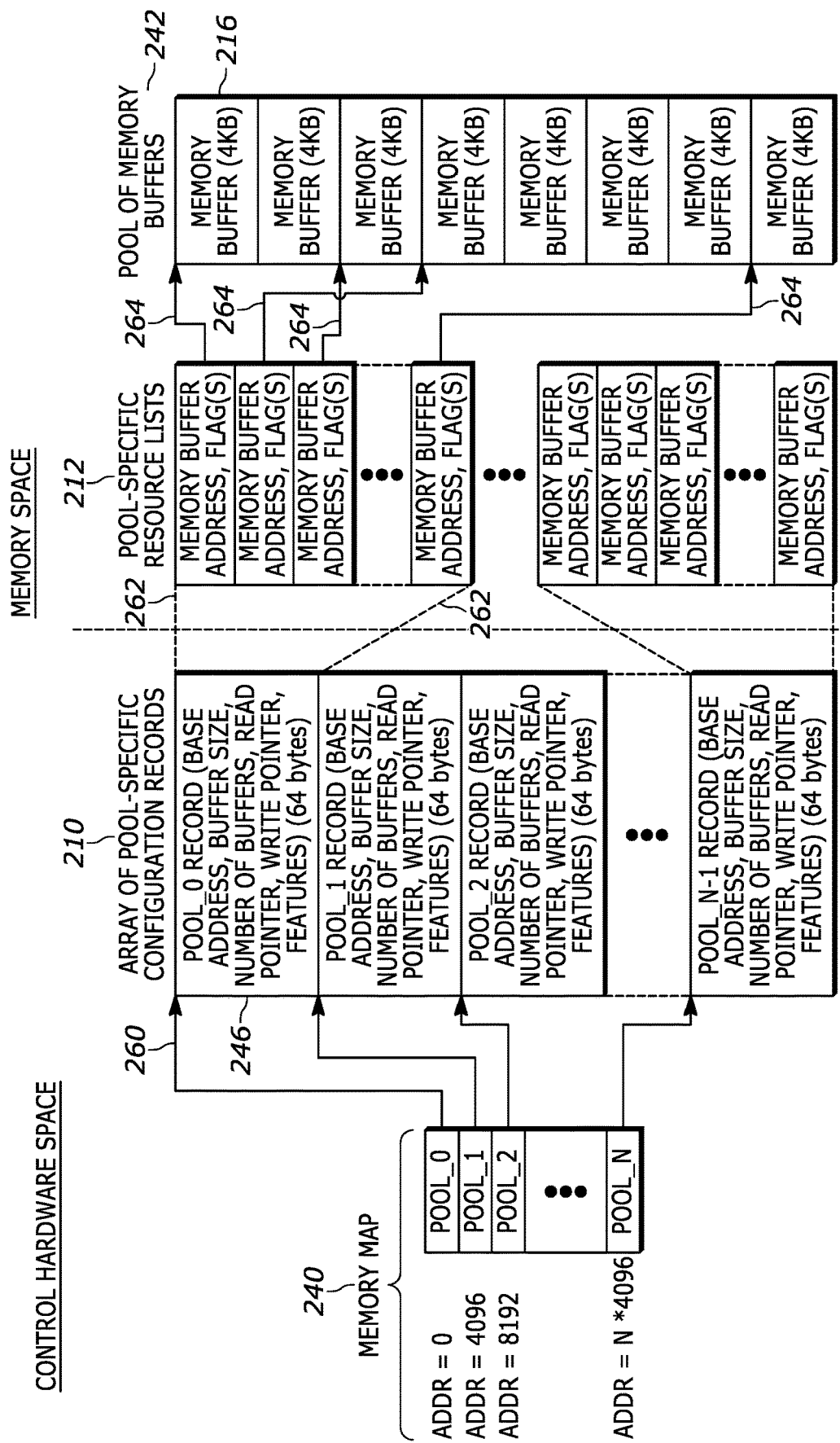
FIG. 2B is similar to FIG. 2A except that the array of memory mapped pool-specific configuration records is stored in hardware registers in the control hardware space instead of in RAM in the memory space.

FIG. 2B is similar to FIG. 2A except that the array of memory mapped pool-specific configuration records 210 is stored in hardware registers in the control hardware space instead of in RAM in the memory space. As illustrated in FIG. 2B, the system memory map and the array of pool-specific configuration records are represented in the control hardware space and the pool-specific resource lists 212 and memory buffers 216 of the pool of memory buffers are represented in a memory space. On the left side of FIG. 2B in the control hardware space, the system memory map includes a page table of addresses, e.g., addresses within the configuration register space provided as binary values, which correspond to hardware register addresses in the control hardware space. In particular, the addresses are separated by 4 KB (4096) each. In binary, the separation of pages by 4 KB is implemented with a 12-bit offset. As illustrated in FIG. 2B, there are N distinct addresses in the address space and in at least one example, N=64 distinct addresses. In an embodiment, each distinct address (also referred to as a "pool identifier" or "resource identifier") corresponds to a pool of buffers in that each distinct address is mapped to a particular hardware register in the control hardware space. For example, as shown in FIG. 2B, address, addr=0, corresponds to pool_0, and pool_0 is mapped to a hardware register at which the record for pool_0 is stored. Likewise, address, addr=4096, corresponds to pool_1, and pool_1 is mapped to a hardware register at which the record for pool_1 is stored, address, addr=8192, corresponds to pool_2, and pool_2 is mapped to a hardware register at which the record for pool_2 is stored, and address, addr=N*4096, corresponds to pool_N−1, and pool_N−1 is mapped to a hardware register at which the record for pool_N−1 is stored. In an embodiment, the mapping from an address in the address space to a hardware register is a function of a base address, a pool number, and an offset between pool-specific configuration records. In the example of FIG. 2B, each pool-specific configuration record is allotted 64 bits in hardware registers and the register address of each pool-specific configuration record can be determined from the base address (e.g., addr=0) as, base address+pool_number*64 bits. Because hardware registers are an expensive resource relative to RAM, the number of pool-specific configurations records that can be practically held on an SoC is much smaller than when stored in RAM, for example, on the order of 16-64 records versus $2^{24}$ records stored in RAM.

Figure 3:
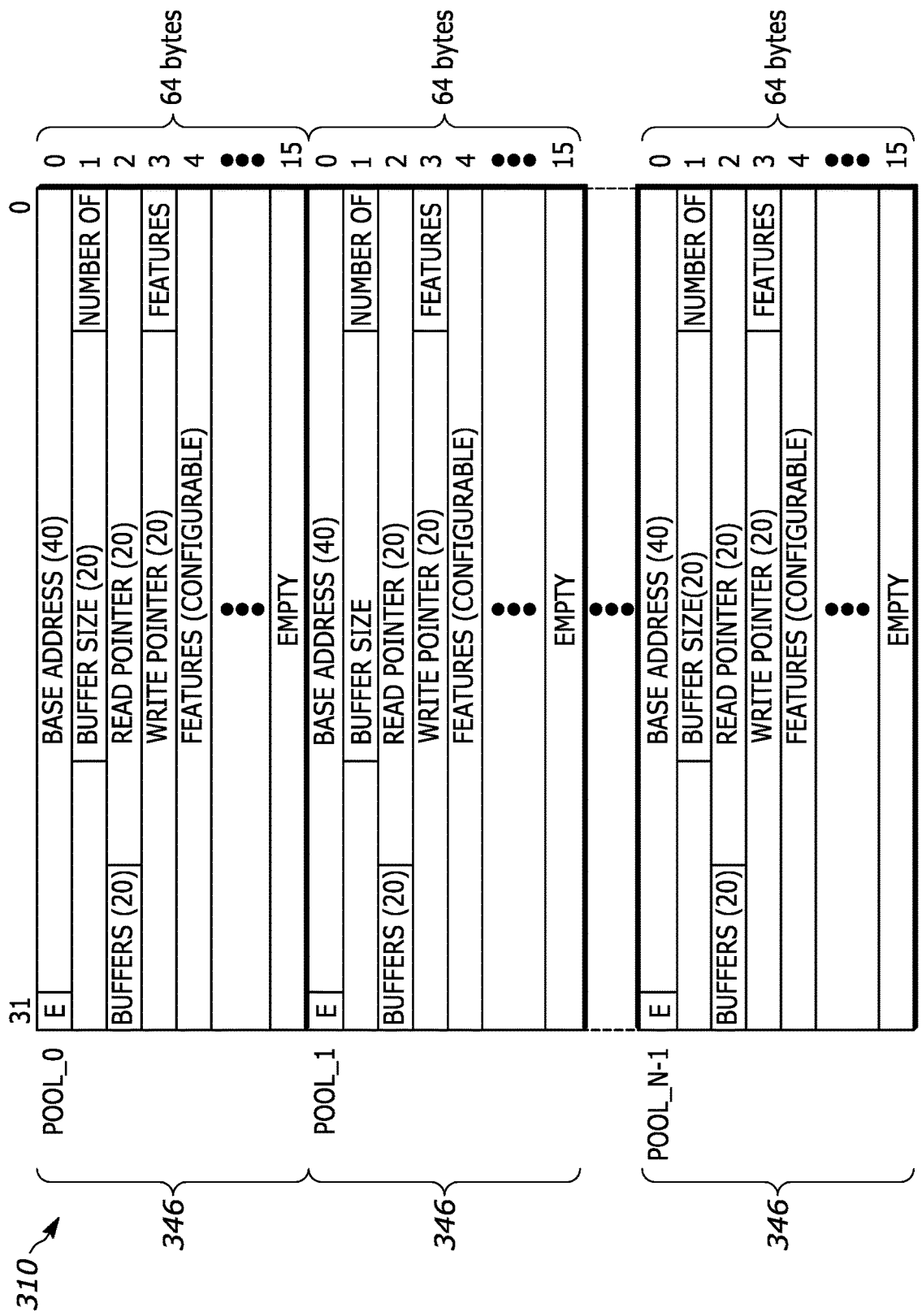
FIG. 3 depicts an expanded view of the pool-specific configuration records depicted in FIG. 2A.

As illustrated in FIGS. 2A and 2B, each pool-specific configuration record 246 of the array of pool-specific configuration records 210 includes a base address, a buffer size, a number of buffers, a read pointer, a write pointer, and features. In an embodiment in which the pool-specific configuration records are stored in RAM, the pool-specific configuration records are organized within the memory in a tightly packed array of 64 byte records and in an embodiment in which the pool-specific configuration records are stored in hardware registers, each record is likely to be much smaller than 64 bytes, e.g., on the order of 64 bits. FIG. 3 depicts an expanded view of the pool-specific configuration records 246 depicted in FIG. 2A. As illustrated in FIG. 3, each pool-specific configuration record 346 of the array of pool-specific configuration records 310 is 64 bytes and each pool-specific configuration record includes an enable field, a base address field, a buffer size field, a number of buffers field, a read pointer field, a write pointer field, and a features field. In the example of FIG. 3, the pool-specific configuration records also include some memory space that has not been designated for any particular data, identified as "empty space." The empty space could be used to store other information as may be determined to be useful at some point. In an embodiment, the enable field is 1 bit, the base address field is 40 bits, the buffer size field is 20 bits, the number of buffers field is 20 bits, the read pointer field is 20 bits, the write pointer field is 20 bits, and the features field is configurable and may utilize any of the remaining bits in the 64 byte field that are allotted to a particular pool-specific configuration record. Note that the fields may not be drawn exactly to scale in FIG. 3. Although the fields are presented as having particular sizes, other field sizes are possible. Additionally, the positions of each field within the pool-specific configuration records can be different and certain embodiments may include fields designated to store different information. In an embodiment, the enable field is designated to store a bit that indicates whether a pool-specific configuration record has been stored in the 64 byte field and the base address field is designated to store an address that points to a physical memory address of the corresponding pool-specific resource list, e.g., a starting, or "base," physical memory address of the pool-specific resource list. The buffer size field is designated to store a binary value that identifies the size of a single memory buffer and the number of buffers field is designated to store a binary value that identifies the number of memory buffers in the pool of memory buffers. The buffer size and the number of buffers together define the overall size of a pool of memory buffers, e.g., in terms of kilobytes (KB), megabytes (MB), gigabytes (GB), etc. The read pointer field is designated to store a read pointer that points to a particular node in the pool-specific resource list and the write pointer field is designated to store a write pointer that points to a particular node in the pool-specific resource list. In an embodiment, the read and write pointers are stored as offsets relative to the base address of the pool-specific resource list.

The features field in the pool-specific configuration records 346 is designated to store information about a feature or features that corresponds to the pool of memory buffers. The particular data that could be stored in the features field of the pool-specific configuration records is application-specific. Features that may be implemented through the features field include, for example, batching, burst allocation/deallocation, security, resource tracking, and pool grouping.

Figure 4A:
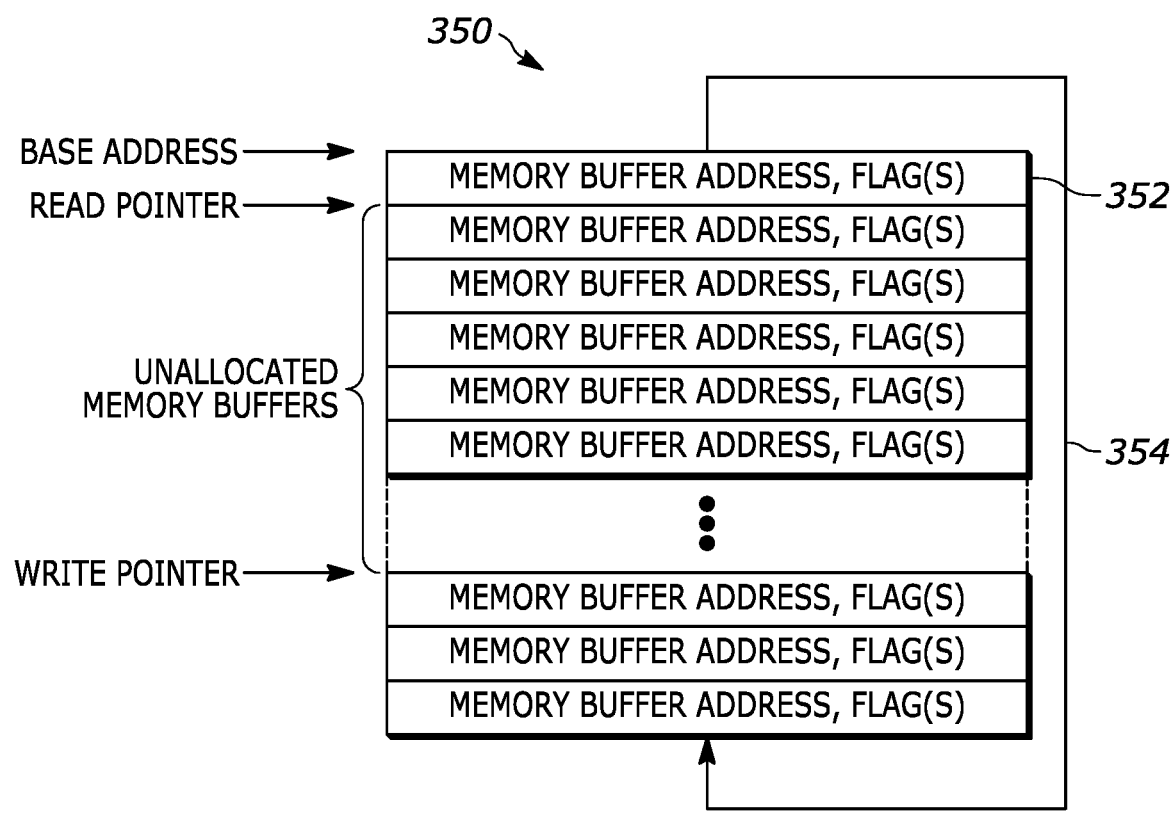
FIG. 4A depicts an example embodiment of a pool-specific resource list that includes an array of nodes.

As described with reference to FIG. 3, the base address stored in a pool-specific configuration record 346 points to a particular pool-specific resource list. FIG. 4A depicts an example embodiment of a pool-specific resource list 350 that includes an array of nodes 352. Each node in the array includes a memory buffer address field and one or more flag fields, identified herein as "flag(s)." The memory buffer address field is designated to store a physical memory address that identifies the memory buffer address of a particular memory buffer and the flag(s) field is designated to store a flag or flags that are associated with the corresponding memory buffer, such as, for example statistics, information on an entity that corresponds to the memory buffer, e.g., what entity the memory buffer is allocated to, or was previously allocated to, and/or whether or not the memory buffer is locked. Although some examples of flags are shown, other information corresponding to a memory buffer may be stored in the flag(s) field. In an embodiment, each node of the resource list is 64 bits, in which the memory buffer address field is 40 bits and the flag(s) field is 24 bits. As described with reference to FIG. 3, the base address, read pointer, and write pointer of a pool-specific configuration record correspond to nodes of a corresponding pool-specific resource list. FIG. 4A depicts a pool-specific resource list in the form of an array of resource list nodes, e.g., an ordered array of resource list nodes that are stored back-to-back in the memory. FIG. 4A also illustrates the node in the resource list that is identified by the base address, the node in the resource list that is identified by the read pointer, and the node in the resource list that is identified by the write pointer. In the example of FIG. 4A, the resource list is a ring resource list as illustrated by the arrow 354 that points from the node at the top of the resource list to the node at the bottom of the resource list although the resource list could be managed as a stacked resource list. In an embodiment, the resource list may be managed as a ring to implement a first-in first-out (FIFO) allocation policy and the resource list may be managed as a stack to implement a last-in last-out (LIFO) allocation policy. In the example of FIG. 4A, it is assumed that all of the corresponding memory buffers are allocated for use except for the memory buffers that correspond to the nodes between the read pointer and the write pointer, which are identified as "unallocated" memory buffers in FIG. 4A. Although the pool-specific resource list depicted in FIG. 4A is stored in an array format, other formats of the pool-specific resource lists are possible.

Figure 4B:
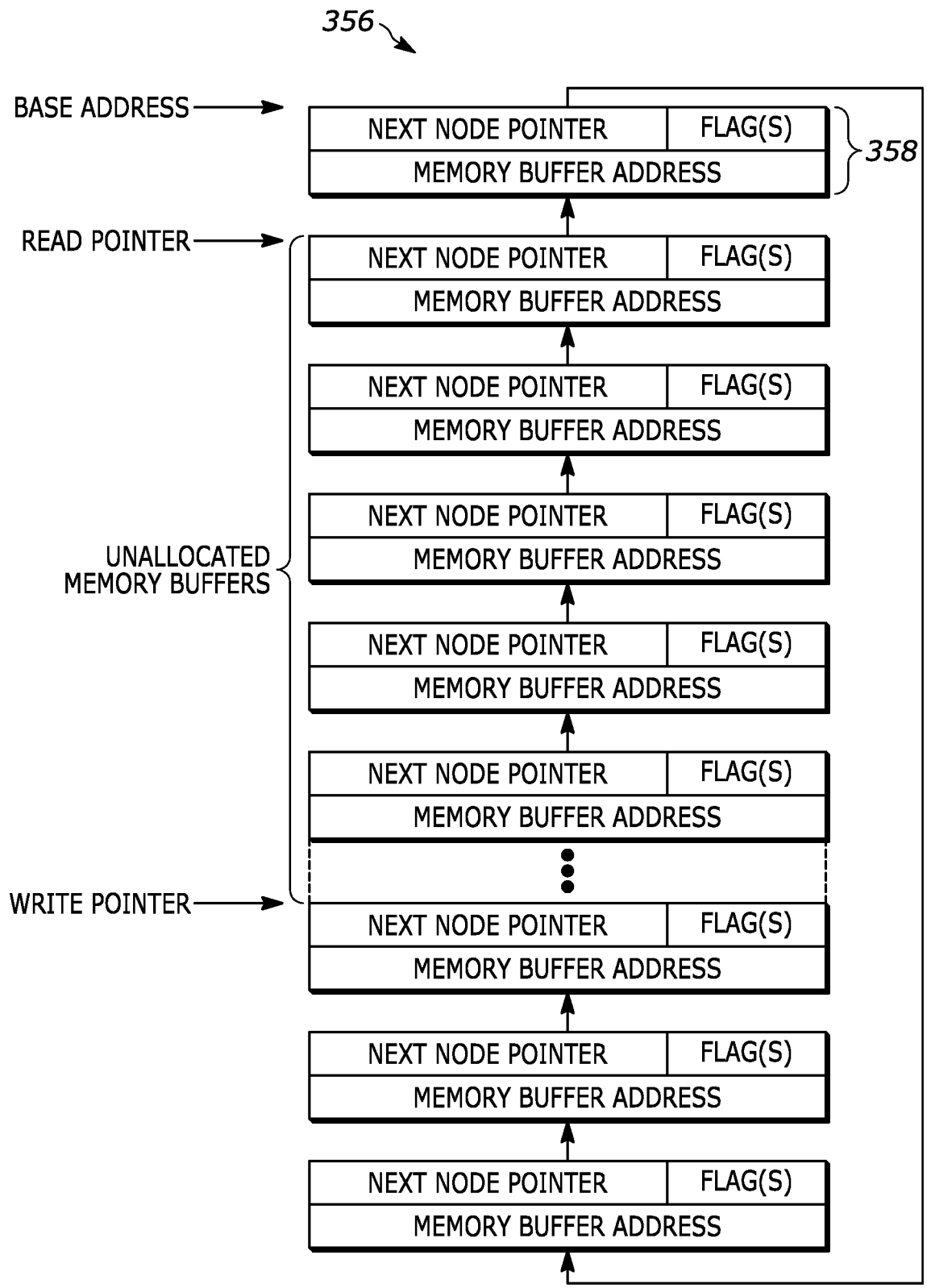
FIG. 4B depicts a pool-specific resource list in the form of a linked list of nodes.

In an embodiment, linked lists can provide additional flexibility to add and/or delete nodes to a resource list. FIG. 4B depicts a pool-specific resource list 356 in the form of a linked list of nodes in which each node 358 includes a next node pointer field, a flag(s) field, and a memory buffer address field. The next node pointer field is designated to store a pointer to the next node in the linked list, the memory address field is designated to store a physical memory address that identifies the memory buffer address of a particular memory buffer, and the flag(s) field is designated to store a flag or flags that are associated with the corresponding memory buffer, such as, for example statistics, information on an entity that corresponds to the memory buffer, e.g., what entity the memory buffer is allocated to, or was previously allocated to, and/or whether or not the memory buffer is locked. Although some examples of flags are shown, other information corresponding to a memory buffer may be stored in the flag(s) field. In an embodiment, each node of the resource list is 16 bytes, in which the next node pointer is 40 bits, the memory buffer address field is 40 bits, and the flag(s) field is 24 bits. In an alternative embodiment of a linked list resource list, the data structure of each node could be integrated into the corresponding memory buffer. For example, the data structure of each node of the linked list could be stored in the 4 KB block of memory of each corresponding memory buffer, e.g., at the top of the memory buffer. The resource list depicted in FIG. 4B is a singly linked list, although in other embodiments, a doubly linked list may be implemented. Resource lists in other formats may also be possible. In another embodiment, the set of pool-specific resource lists, 112 and 212, as depicted in FIGS. 1 and 2, respectively, may include a combination of different types of resource lists, including, for example, a combination of array type resource lists as described with reference to FIG. 4A and linked-list type resource lists as described with reference to FIG. 4B.

Returning back to FIG. 2A, the relationship between a memory mapped address and a pool of memory buffers is summarized with reference to FIG. 2A. As illustrated by the arrow 260 in FIG. 2A, an address (e.g., an allocator register space address of addr=0), which may be stored in a hardware register of the control hardware space (e.g., in the address register 122 of the memory mapped register interface 104 of FIG. 1), is mapped to a physical memory address (e.g., a base address) at which a corresponding pool-specific configuration record 246 is stored in memory, e.g., in RAM. As illustrated by the dashed lines 262, the pool-specific configuration record of pool_0 has a corresponding pool-specific resource list that is stored in memory starting at a base physical memory address. As described above, each node of the pool-specific resource list includes a physical memory address of a memory buffer. Memory buffers 216 that correspond to nodes of the pool-specific resource list are identified by the arrows 264. The memory buffers that are identified within the nodes of a pool-specific resource list define a pool of memory buffers. The memory buffers that are identified within the nodes of a pool-specific resource list may be physically close to each other, or the memory buffers may be distributed throughout the available memory resources. In sum, FIG. 2A illustrates the relationship between an address (e.g., an allocator register space address) and a pool of memory buffers.

Given the memory mapped register interface and data structures described with reference to FIGS. 1-4B, attention is now turned to the process of servicing memory resource allocation requests, which includes requests to allocate memory buffers and requests to deallocate (or free) memory buffers. In an embodiment, requests to allocate memory buffers involve read operations and requests to deallocated (or free) memory buffers involve write operations. An example of a read operation is described with reference to FIGS. 5A-5C and an example of a write operation is described with reference to FIGS. 6A-6C.

Figure 5A:
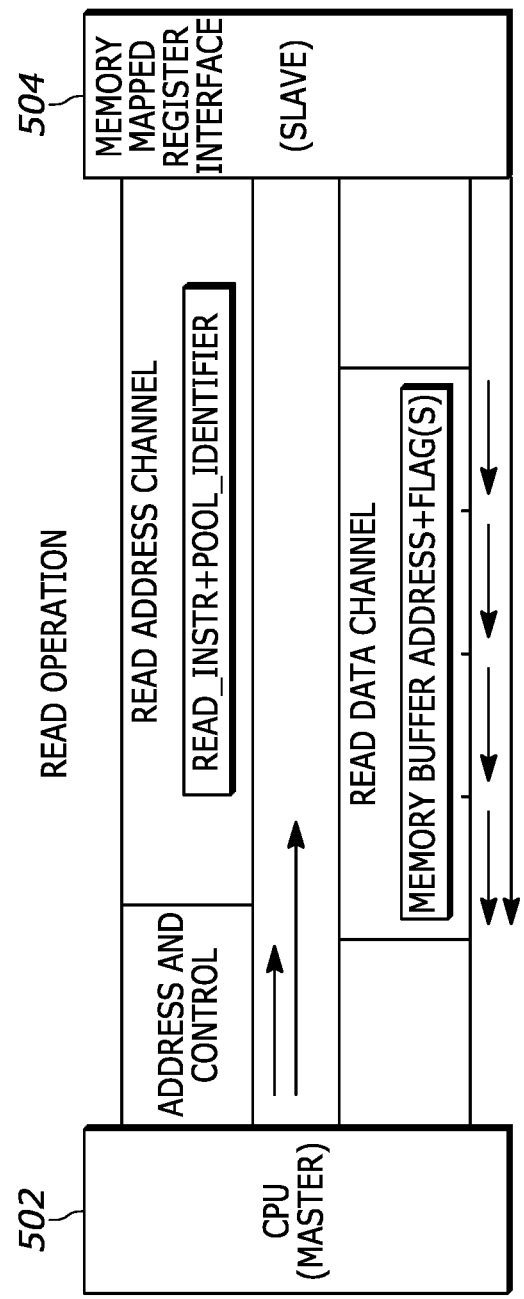
FIG. 5A illustrates an example of a data exchange that is involved in a read operation.

FIG. 5A illustrates an example of a data exchange that is involved in a read operation between, for example, the CPU 102 and the memory mapped register interface 104 of FIG. 1. In the example of FIG. 5A, the CPU 502 is the master and the memory mapped register interface 504 is the slave and the CPU initiates the read operation. As illustrated in FIG. 5A, a read instruction (read_instr) and read address information, e.g., a configuration register address in the address space of the corresponding computing system, also referred to as a pool identifier (pool_identifier), are communicated via a read address channel and corresponding registers and data that is read as a result of the read operation is returned to the CPU via a read data channel and corresponding registers. The result of the read operation may include a memory buffer address of the allocated memory buffer and flags associated with the memory buffer that are read from a pool-specific resource list. Further description of the read operation is described below with reference to FIGS. 5B and 5C.

Figure 5B:
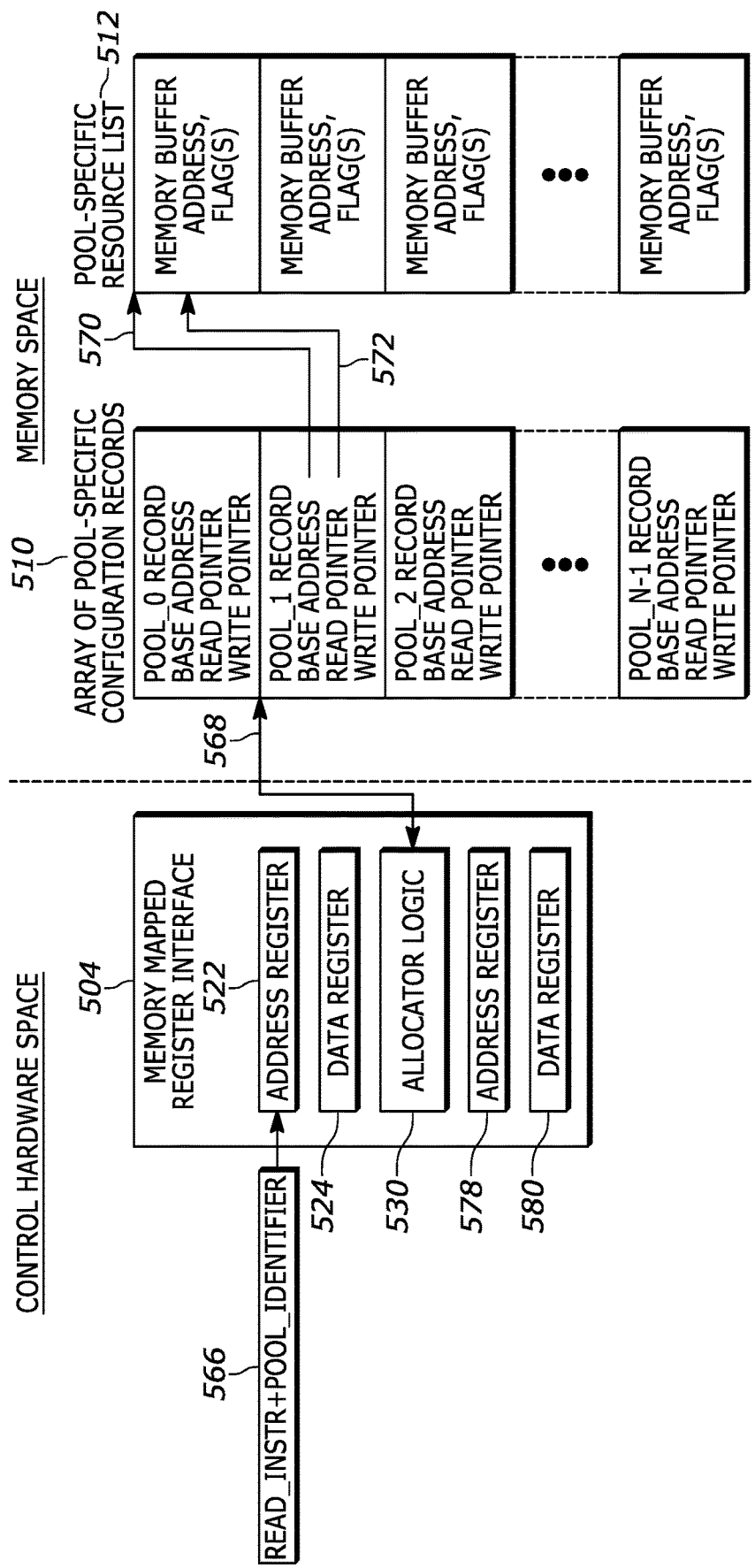
FIGS. 5B and 5C illustrate operations associated with a read operation that occur in the control hardware space and the memory space.
Figure 5C:
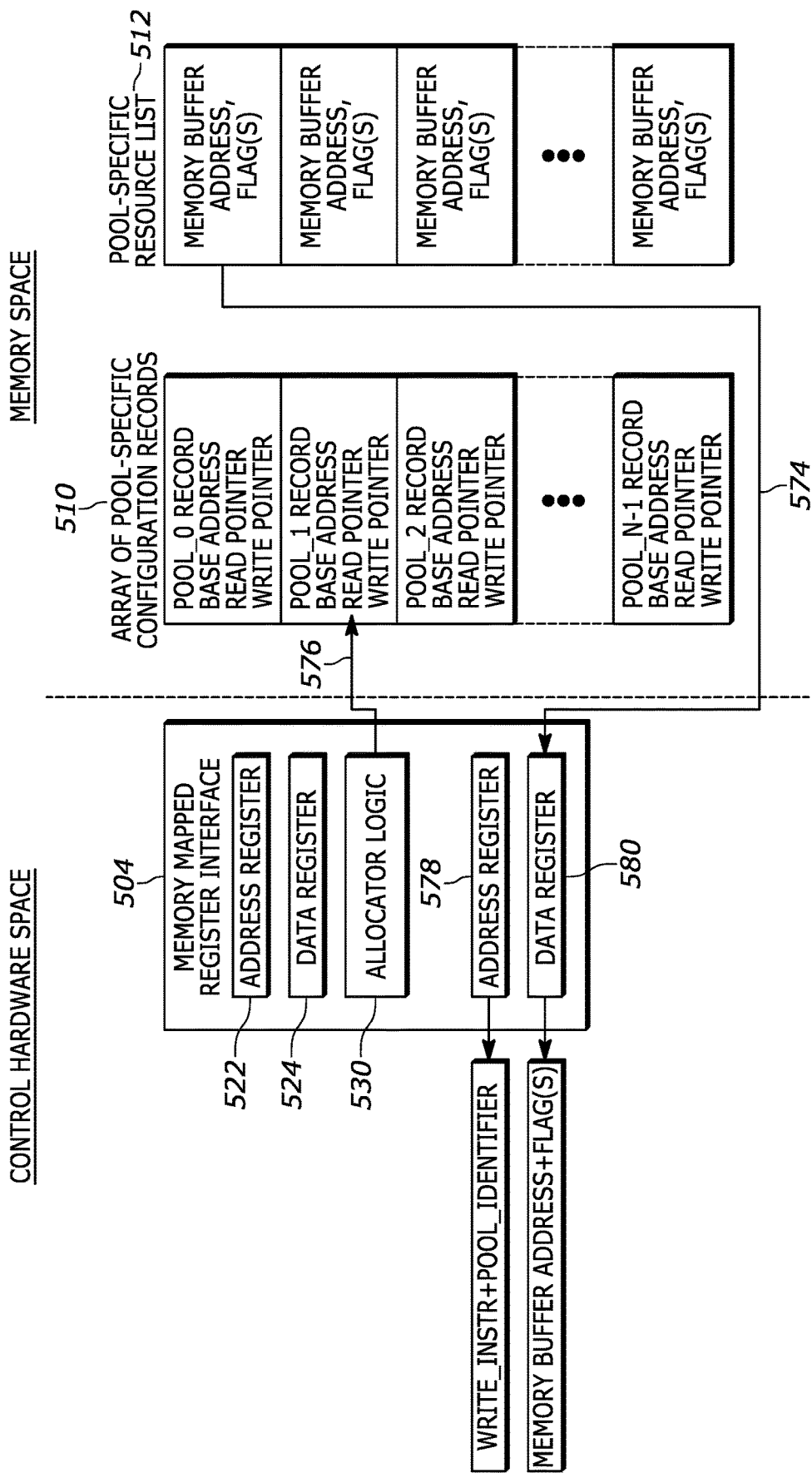

FIGS. 5B and 5C illustrate operations associated with a read operation that occur in the control hardware space and the memory space. For example, the operations performed by the allocator logic 530 of the memory mapped register interface 504 in a read operation include receiving a read request for memory resource allocation, reading a pool-specific configuration record from the array, if the resource list is not empty (e.g., read!=write), reading a resource list (e.g., the read pointer) and returning a memory buffer address as a response to the read request, advancing the read pointer, and updating the read pointer in the pool-specific configuration record. With reference now to FIG. 5B, a read request 566 is received at the address register 522 of the memory mapped register interface in the form of a binary value that includes a read instruction and a pool identifier (read_instr+pool_identifier), in which the pool identifier may be an address used by the CPU. The pool identifier is used by the allocator logic to read the corresponding pool-specific configuration record from the array of memory mapped pool-specific configuration records. For example, the memory mapped register interface maps the pool identifier to a base physical memory address of the array of pool-specific configuration records 510 and then generates the physical memory address of the specific record as a function of the base physical memory address+pool_number*64 bytes. The memory mapping to and reading of the pool-specific configuration record are illustrated in FIG. 5B by the arrow 568. As described above with reference to FIG. 3, the pool-specific configuration record at the corresponding physical memory address includes a base address, a read pointer, and a write pointer of a pool-specific resource list, which the allocator logic uses to first determine that the resource list is not empty (e.g., read_ptr!=write_ptr), and if the resource list is not empty, to identify the node in the resource list to which the read pointer points. The identification of the base address of the pool-specific resource list is illustrated in FIG. 5B by the arrow 570 and the identification of the read pointer of the node that is to be read from is illustrated in FIG. 5B by arrow 572. Although not illustrated in FIG. 5B, the memory buffer address in each node of the resource list corresponds to a particular memory buffer as illustrated in FIG. 2A.

With reference now to FIG. 5C, the allocator logic 530 reads the memory buffer address from the node identified by the read pointer for return to the CPU as illustrated by arrow 574. In an embodiment, the memory mapped register interface includes separate address and data registers (578 and 580) for writing the memory buffer address, which was read from the pool-specific resource list, to the CPU. In addition to returning the memory buffer address that was read from the pool-specific resource list, the allocator logic advances the read pointer to the next node in the resource list. In an embodiment, the read pointer is advanced to the next node by incrementing a pointer value by a fixed increment, e.g., by a fixed number of bits or bytes that corresponds to the size of each node in the list, such that the read pointer points to the physical memory address of the beginning of the next node in the resource list. If the resource list is a linked list, the pointer value is advanced to the next node in the linked list as indicated by the next node pointer. After the read pointer is advanced, the read pointer field in the pool-specific configuration record is updated with the advanced read pointer as illustrated by arrow 576.

Figure 6A:
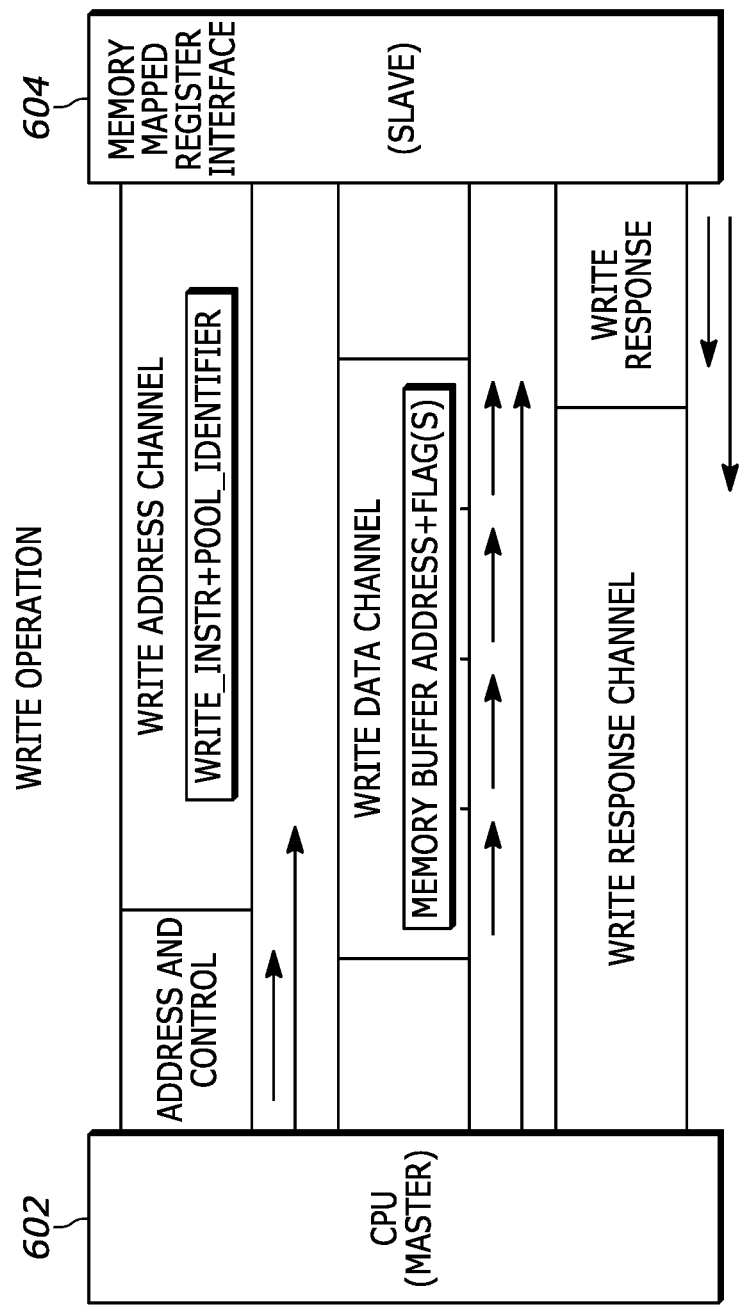

FIG. 6A illustrates an example data exchange that is involved in a write operation between, for example, the 102 CPU and the memory mapped register interface 104 of FIG. 1. In example of FIG. 6A, the CPU 602 is again the master and the memory mapped register interface 604 is again the slave and the CPU initiates the write operation. As illustrated in FIG. 6A, a write instruction (write_instr) and write address information, e.g., a configuration register address in the address space of the corresponding computing system (also referred to as the pool_identifier), are communicated via a write address channel and corresponding registers and data that is to be written as a result of the write operation (e.g., a memory buffer address) is provided to the slave via a write data channel and corresponding registers, and reporting of an outcome of the write operation (e.g., a write response) is communicated via a write response channel.

Figure 6B:
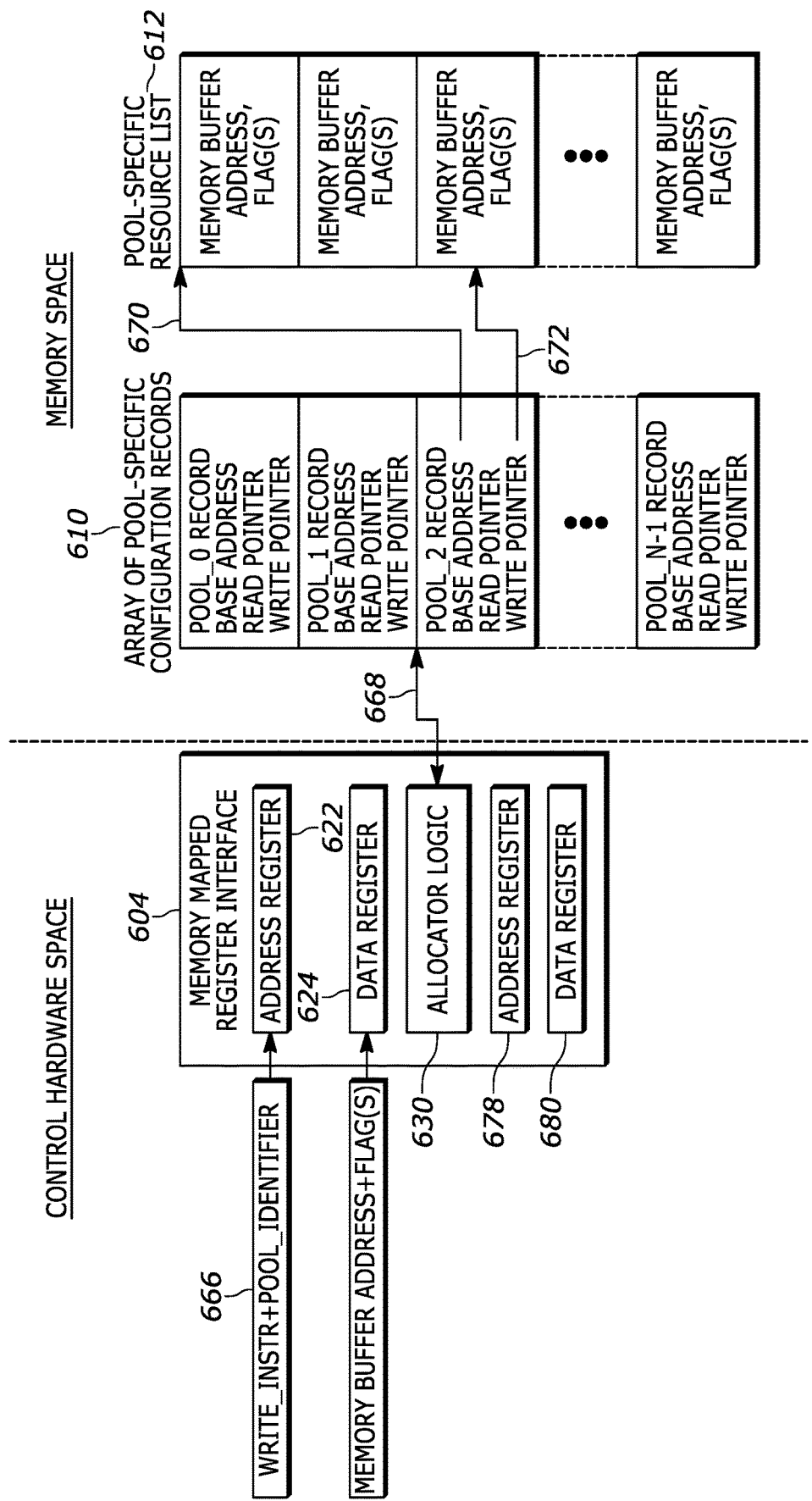
FIGS. 6B and 6C illustrate operations associated with a write operation that occur in the control hardware space and the memory space.
Figure 6C:
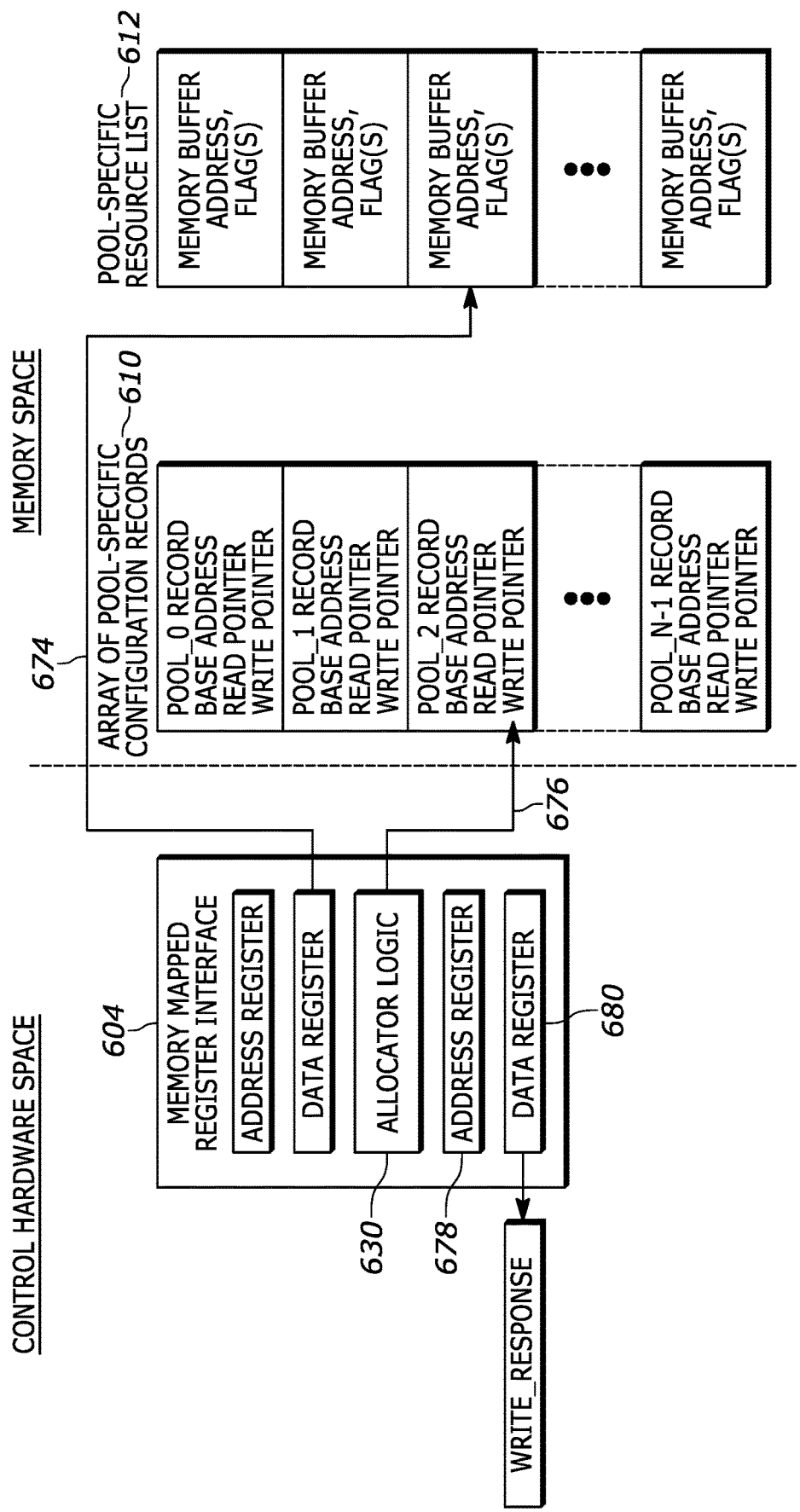

FIGS. 6B and 6C illustrate operations associated with a write operation that occur in the control hardware space and the memory space. For example, the operations performed by the allocator logic 630 of the memory mapped register interface 604 in a write operation include receiving a write request for memory resource allocation, wherein the write request includes a memory buffer address being deallocated, reading pool-specific configuration record from the array, if resource list not full, writing the memory buffer address (and flag(s)) to resource list (write pointer), advancing the write pointer, and updating the write pointer in the pool-specific configuration record. With reference now to FIG. 6B, a write request 666 is received at the address register and at the data register of the memory mapped register interface in the form of a first binary value that includes a write instruction and a pool identifier (write_instr+pool_identifier), in which the pool identifier may be an address, and a second binary value that includes the memory buffer address that is to be written and any flags. The pool identifier is used by the allocator logic to read the corresponding pool-specific configuration record from the array of memory mapped pool-specific configuration records. For example, the memory mapped register interface maps the pool identifier to a base physical memory address of the array of pool-specific configuration records and then generates the physical memory address of the specific record as a function of the base physical memory address+pool_number*64 bytes. The memory mapping and reading of the pool-specific configuration record is illustrated in FIG. 6B by arrow 668. As described above with reference to FIG. 3, the pool-specific configuration record at the corresponding physical memory address includes a base address, a read pointer, and a write pointer of a pool-specific resource list, which the allocator logic uses to first check if the resource list is full (e.g., read_ptr=write_ptr), and if the resource list is not full, to identify the node in the resource list to which the write pointer points. The identification of the base address of the pool-specific resource list is illustrated in FIG. 6B by arrow 670 and the identification of the write pointer of the node that is to be written to is illustrated in FIG. 6B by arrow 672. Although not illustrated in FIG. 6B, the memory buffer address in each node of the resource list corresponds to a particular memory buffer as illustrated in FIG. 2A.

With reference now to FIG. 6C, the allocator logic 630 writes the memory buffer address that is held in the data register 624 of the memory mapped register interface 604 to the node that is identified by the write pointer as illustrated by arrow 674. In an embodiment, once the write is complete, the memory mapped register interface acknowledges to the CPU that the write was completed (write_response). In addition to acknowledging the write, the allocator logic advances the write pointer to the next node in the resource list. In an embodiment, the write pointer is advanced to the next node by incrementing a pointer value by a fixed increment, e.g., by a fixed number of bits or bytes that corresponds to the size of each node in the list, such that the read pointer points to the physical memory address of the beginning of the next node in the resource list. If the resource list is a linked list, the pointer value is advanced to the next node in the linked list as indicated by the next node pointer. After the write pointer is advanced, the write pointer field in the pool-specific configuration record is updated with the advanced read pointer as illustrated by arrow 676.

As described with reference to FIGS. 5A-5C and 6A-6C, the memory mapped register interface can implement both read and write operations to service memory resource allocation requests, which include requests to allocate memory buffers to entities (read operations) and requests to deallocate (e.g., free) memory buffers from entities (write operations). Additionally, although in the examples described with reference to FIGS. 5A-5C and 6A-6C, the array of pool-specific configuration records is stored in the memory space (e.g., in RAM), similar operations are involved to implement read and write operations when the array of pool-specific configuration records is stored in hardware registers in the control hardware space.

Figure 7:
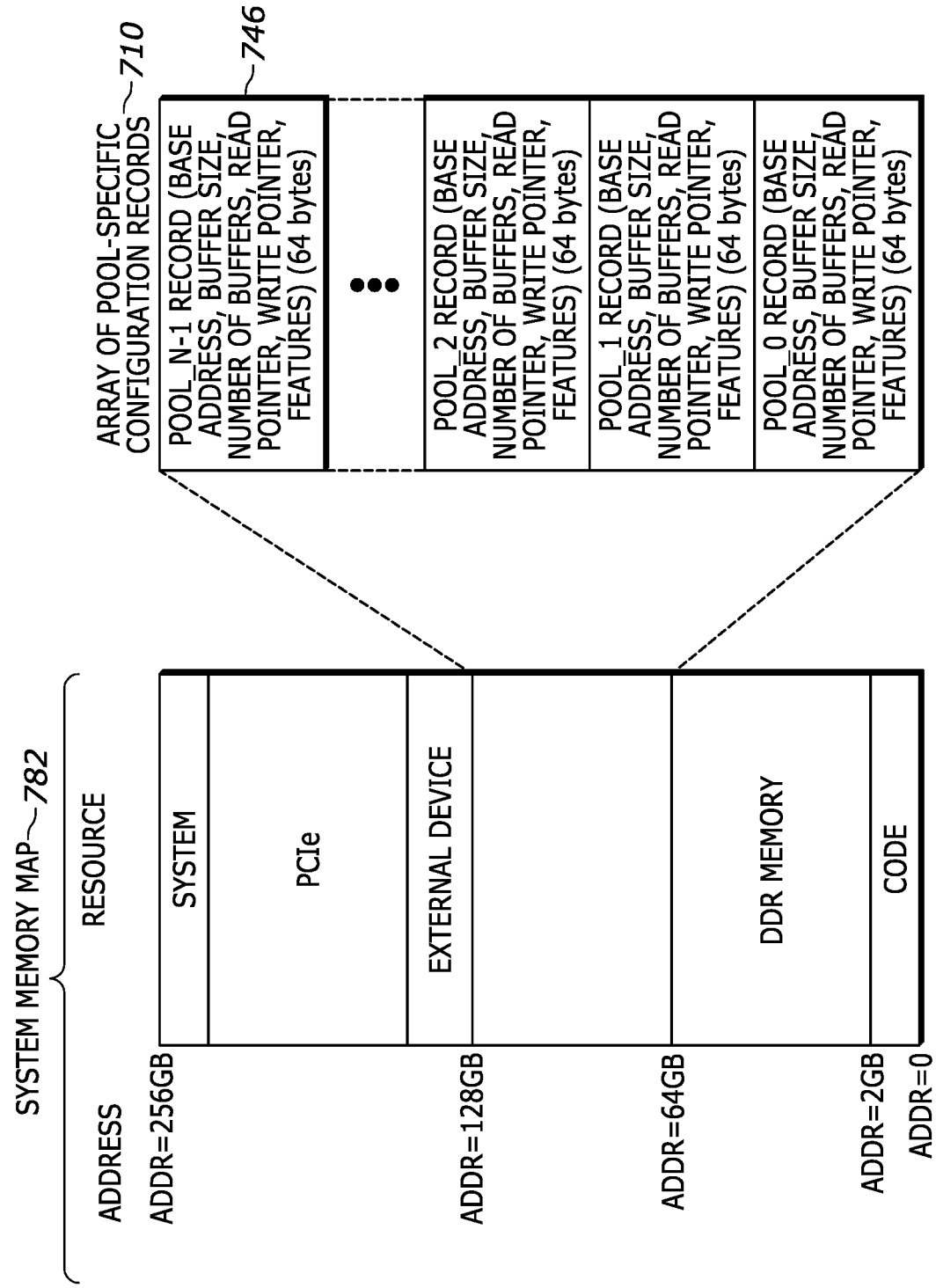
FIG. 7 illustrates an array of pool-specific configuration records that are memory mapped from addresses in a system memory map to physical memory addresses of a computing system such as the computing system described with reference to FIGS. 1 and 2.

As described above, pool identifiers are memory mapped to an array of pool-specific configuration records that are stored in RAM. In an embodiment, the pool identifiers are memory mapped using addresses in the address space of the system memory map of the computing system in which the resource allocation requests are processed. As is known in the field of processor based computing systems, a system memory map is used to map addresses to configuration registers and physical memory addresses and the system memory map is fixed upon bootup of the computing system. For ease of use purposes, in digital computing systems, addresses are often separated by a page of, for example, 4096 addresses (often referred to as page resolution), and the addresses are collectively referred to as a page table. FIG. 7 illustrates an array of pool-specific configuration records 710 that are memory mapped from addresses in a system memory map 782 to physical memory addresses of a computing system such as the computing system described with reference to FIGS. 1 and 2. It is common for system memory maps to be graphically represented with the addresses in a left column increasing in binary value from the bottom to the top with the corresponding resource, or resource assignment, identified in a right column. As shown in FIG. 7, the example system memory map includes an address space from address 0 GB to address 2 GB that corresponds to code, an address space from 2 GB-64 GB that corresponds to DDR memory, an address space from 64 GB-128 GB that corresponds to the array of pool-specific configuration records, and an address space from 128 GB-256 GB that corresponds to external devices, PCIe, and other system elements ("system" in FIG. 7). In the example of FIG. 7, the addresses are expressed in terms of gigabytes (GB), although in other examples the addresses are expressed in hexadecimal format or in binary format. In the embodiment of FIG. 7, the address space is 40 bits wide and the lower 12 bits serve as a page offset, e.g., a 4 KB offset, or "page resolution" and the CPU is a 64-bit processor with the lower 40 bits of the 64-bit instruction being used for addressing.

FIG. 7 also depicts an expanded view of the pool-specific configuration records 746 that correspond to the addresses in the page table. In particular, FIG. 7 illustrates that addresses within a particular address space of the system memory map are mapped to physical memory addresses, e.g., in the RAM, that correspond to pool-specific configuration records. Integrating the memory mapped pool-specific configuration records into a section of addresses within the address space of the system memory map of a computing system enables the array of pool-specific configuration records to be accessed by low-level hardware-based register reads and register writes, which enables the hardware-based memory resource allocation operations described herein.

Figure 8A:
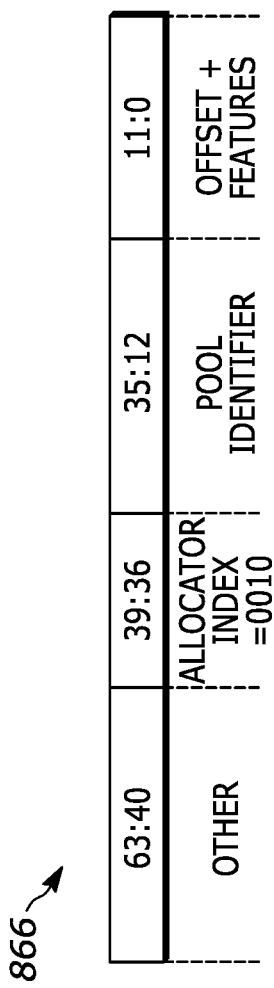
FIG. 8A depicts an example of a resource allocation request.

FIG. 8A depicts an example of a resource allocation request 866 that is 64 bits. In the example, the lower 12 bits are an offset (bits [11:0]), the next 24 bits (bits [35:12]) are the pool identifier, the next four bits (bits [39:36]) are part of the address space and are used to direct/steer the resource request to the memory mapped register interface, and the upper 24 bits (bits [63:40]) are available to carry additional information related to the resource requests, including, for example, whether the resource allocation request is a read request (e.g., read instruction or "read_instr") or a write request (e.g., a write instruction or "write_instr"). In an embodiment, bits [39:36] are used to steer the memory resource allocation request to the memory mapped register interface. For example, the binary value "0010" of bits [39:36] causes a steering circuit of the network-on-chip of the computing system to steer the memory resource allocation request to the memory mapped register interface.

Figure 8B:
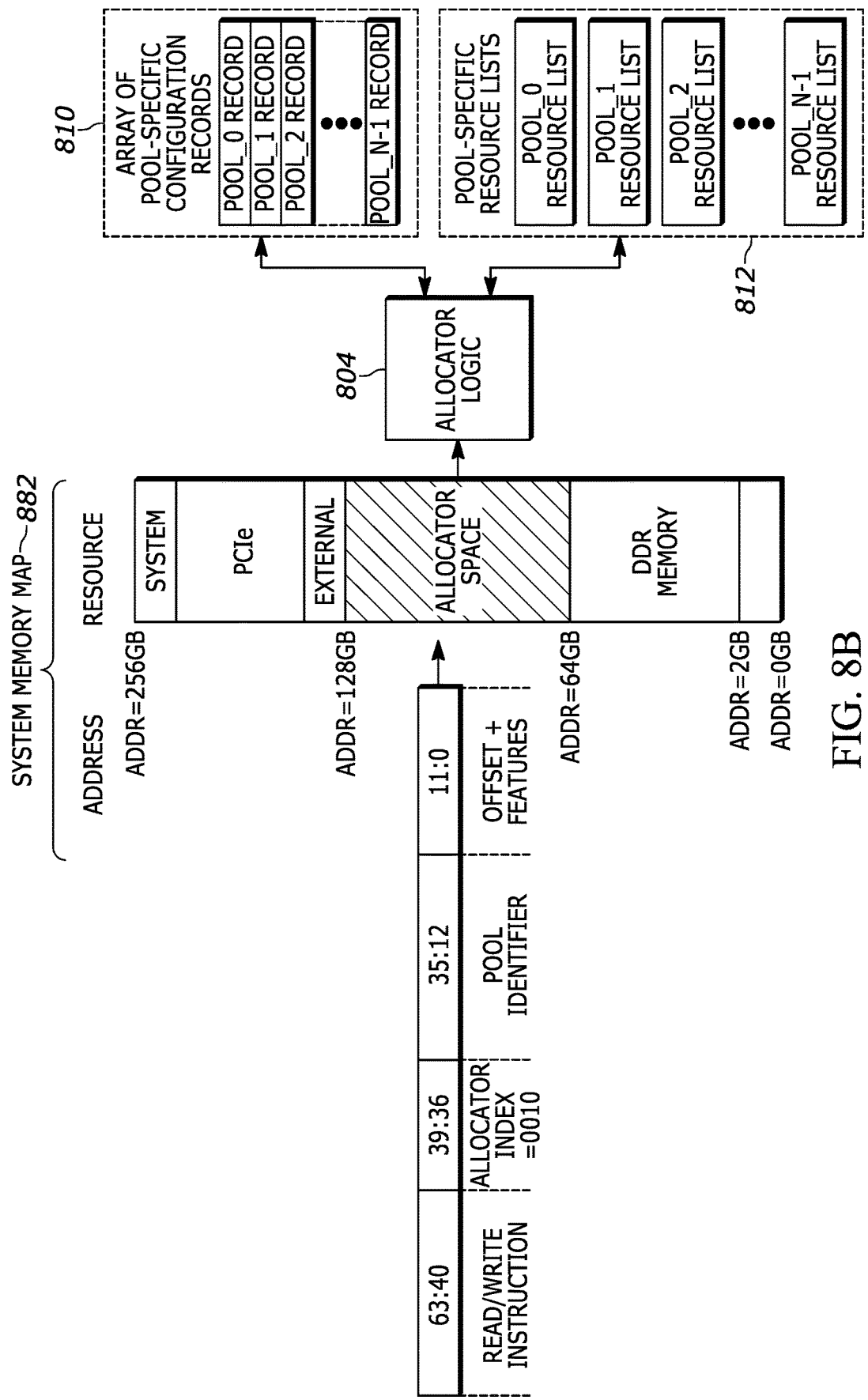
FIG. 8B illustrates the processing of read requests and write requests in the case where an array of pool-specific configuration records is memory mapped to physical memory addresses using a range of addresses in the page table of the system memory map of the computing system for which resources are being allocated.

With an array of pool-specific configuration records memory mapped in a system memory map as illustrated in FIG. 7, read requests and write requests as shown in FIG. 8A can be processed by a memory mapped register interface as described above with reference to FIGS. 5A-5C and FIGS. 6A-6C. FIG. 8B illustrates the processing of read requests and write requests in the case where an array of pool-specific configuration records is memory mapped to physical memory addresses using a range of addresses in the page table of the system memory map of the computing system for which resources are being allocated. As illustrated in FIG. 8B, a 64-bit read or write request (which is received at the memory mapped register interface) is utilized by the allocator logic 804 of the memory mapped register interface to read the corresponding memory mapped pool-specific configuration record from the array of pool-specific configuration records 810 (which could be in hardware registers or RAM) and to perform read or write operations by interacting with a pool-specific resource list from the pool-specific resource lists 812 that corresponds to a particular pool of memory buffers as described above with reference to, for example, FIGS. 5A-5C and FIGS. 6A-6C, respectively.

As described with reference to FIGS. 1, 5A-5C, 6A-6C, and 8B, resource allocation requests are processed by the memory mapped register interface. In an embodiment, the memory mapped register interface is a single hardware circuit through which all resource allocation requests are processed. For example, the memory mapped register interface is configured to process memory resource allocation requests serially through a multi-stage pipeline such that race conditions are avoided, shared memory can be utilized by multiple different processes/entities without the need for a locking mechanism, and contention between read and write requests is eliminated even when different processes/entities are using the same pool of memory buffers.

Figure 9:
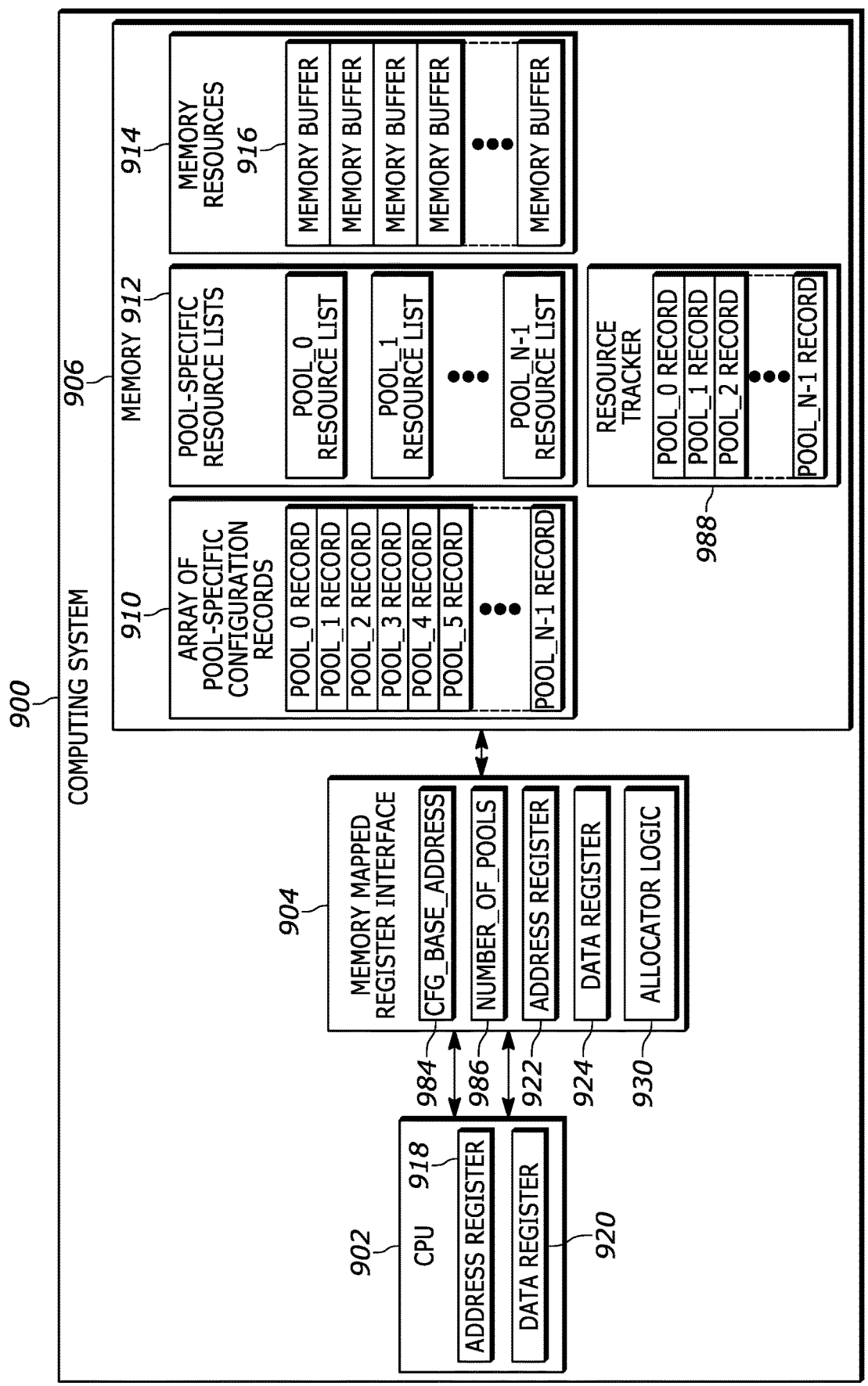
FIG. 9 depicts a computing system similar to the computing system shown in FIG. 1 in which the memory mapped register interface includes a base address configuration register and a number of pools register.

In an embodiment, the computing system described herein is initialized in a software driven initialization process. For example, the initialization process involves allocating memory buffers to particular pools of memory buffers, populating the pool-specific resource lists, and populating the array of pool-specific configuration records. In an embodiment, the pool-specific configuration records are configured as a function of a base address, a number of pools, and a configuration record size. FIG. 9 depicts a computing system similar to the computing system shown in FIG. 1 in which the memory mapped register interface includes a base address configuration register 984 (CFG_BASE_ADDRESS), and a number of pools register 986 (NUMBER_OF_POOLS). In an initial operation, the memory mapped register interface establishes the pool-specific configuration records according to the base address, the number of pools, and a fixed record size, e.g., 64 bytes per record. Further, in an embodiment, the system memory map (e.g., as described with reference to FIGS. 7 and 8B), is preconfigured in the computing system and fixed at bootup of the computing system.

Figure 10:
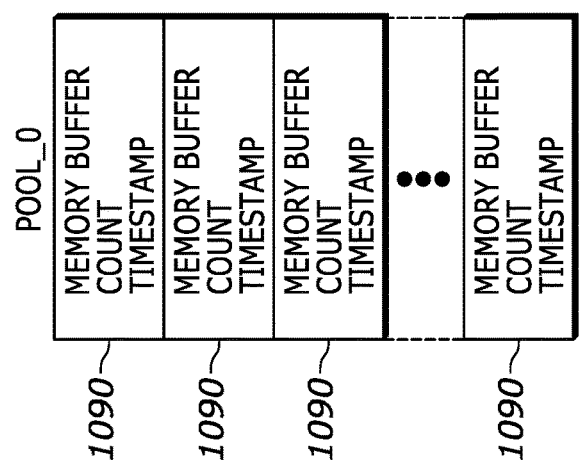
FIG. 10 depicts an example of tracking records for pool 0 (pool_0) that includes a resource-specific tracking record 1090 for each memory buffer in the pool.

In an embodiment, the memory stores pool-specific resource trackers that can be used to manage a memory buffer that can be simultaneously allocated to more than one process/entity. In general, a resource tracking record can be maintained for each memory buffer of a pool and the resource tracking record can be used to determine if a memory buffer can be returned to an unallocated portion of a resource list (e.g., freed or added to a "free list"). In the example computing system 900 of FIG. 9, the memory 906 also includes a resource tracker 988 that includes pool-specific resource tracking records. FIG. 10 depicts an example of tracking records for pool 0 (pool_0) that includes a resource-specific tracking record 1090 for each memory buffer in the pool. As shown in FIG. 10, each resource-specific tracking record includes a count or counter and optionally a timestamp. In an embodiment, the count is stored an 8-bit field and the timestamp is stored a 32-bit field, although the count field and timestamp field may be of different sizes. In an embodiment, the size of the counter field is a function of the largest number of entities that might be allocated the same memory buffer during overlapping periods of time and the size of the timestamp is a function of the maximum period of time over which a memory buffer would be allocated to an entity.

Figure 11:
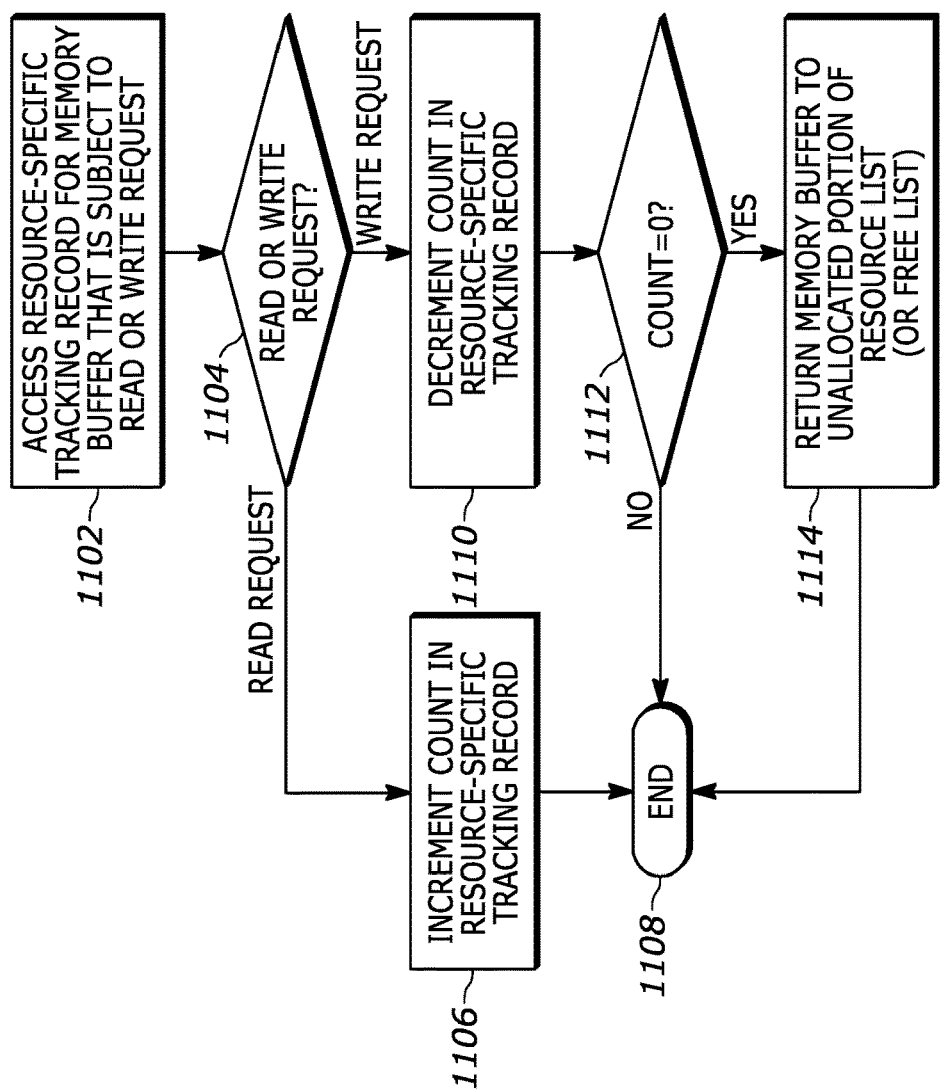
FIG. 11 is a process flow diagram of an example resource tracking operation that is triggered by a flag in a read/write request and implemented by the allocator logic of the memory mapped register interface.

The count can be used to determine whether or not the corresponding memory buffer can be returned to an unallocated portion of a pool specific resource list (e.g., added to a free list) upon processing a write request (deallocation) corresponding to the memory buffer. In an embodiment, resource tracking is triggered by a flag in a resource allocation request (e.g., by setting a particular bit in the lower bits, such as in the offset bits [11:0]) and implemented by the allocator logic of the memory mapped register interface. FIG. 11 is a process flow diagram of an example resource tracking operation that is triggered by a flag in a read/write request and implemented by the allocator logic of the memory mapped register interface. At block 1102, a resource-specific tracking record for a memory buffer that is subject to a read or write request is accessed from the RAM. If it is determined at decision point 1104 that the request is a read request, the process proceeds to block 1106, and a count in the resource-specific tracking record is incremented, e.g., by increased by one increment at block 1108. In the case of a read request the process ends after the count is incremented. If it is determined at decision point 1104 that the request is a write request, the process proceeds to block 1110, and a count in the resource-specific tracking record is decremented, e.g., decreased by one increment. After decrementing the count, at decision point 1112, it is determined if the count equals zero. If the count does not equal zero, then the process ends at block 1108. In an embodiment, the process ends without the memory buffer being returned to the unallocated portion of the corresponding resource list (or without being added to a free list) because the nonzero count indicates that the memory buffer is still allocated to at least one other process/entity. If, however, it is determined at decision point 1112 that the count equals zero, the memory buffer is returned to the unallocated portion of the resource list (also referred to as "freed," or returned to the free list) and the process ends at block 1108. In an embodiment, the memory buffer is returned to the unallocated portion of the resource list (also referred to as "freed," or returned to the free list) upon a zero count because the zero count indicates that the memory buffer is not currently allocated to any other process/entity. Although in the example of FIG. 11, incrementing, decrementing, and a zero count are used to track an allocation state of memory buffers, other techniques for tracking the state of memory buffers could be used, for example, decrementing on write and incrementing on read, and/or using a start/base value other than zero. The technique described above with reference to FIGS. 9-11 for tracking the allocation state of memory buffers provides a reliable way to maintain allocation state for each memory buffer in a manner that can be implemented in hardware and that uses a small amount of RAM.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for memory resource allocation, the method comprising:
   reading a pool-specific configuration record from an array of memory mapped pool-specific configuration records according to a memory resource allocation request that is held in an address register of a memory mapped register interface;
   performing a memory resource allocation operation to service the memory resource allocation request, wherein performing the memory resource allocation operation involves interacting with a resource list according to a pointer in the pool-specific configuration record, wherein the memory mapped register interface, including the address register, is implemented in hardware circuits;
   advancing the pointer after the interaction; and
   updating the pointer in the pool-specific configuration record with the advanced pointer.

2. The method of claim 1, the array of memory mapped pool-specific configuration records is stored in hardware registers and wherein reading a pool-specific configuration record from the array of memory mapped pool-specific configuration records comprises generating a physical memory address in the hardware registers from a value in the address register of the memory mapped register interface.

3. The method of claim 1, wherein the array of memory mapped pool-specific configuration records is stored in random access memory (RAM), and wherein reading a pool-specific configuration record from the array of memory mapped pool-specific configuration records comprises generating a physical memory address in the RAM from a value in the address register of the memory mapped register interface.

4. The method of claim 3, wherein performing the memory resource allocation operation involves reading a memory buffer address from the resource list according to a read pointer in the pool-specific configuration record.

5. The method of claim 3, wherein performing the memory resource allocation operation involves writing a memory buffer address from a data register in the memory mapped register interface to the resource list according to a write pointer in the pool-specific configuration record.

6. The method of claim 1, wherein the pool-specific configuration record includes a base address of the resource list, a read pointer to the resource list, and a write pointer to the resource list.

7. The method of claim 6, wherein each pool-specific configuration record in the array of pool-specific configuration records identifies a resource list that defines a pool of memory buffers.

8. The method of claim 1, wherein the pool-specific configuration record includes a base address of the resource list, a read pointer to the resource list, a write pointer to the resource list, and at least one feature that is stored in a features field.

9. The method of claim 1, wherein performing a memory resource allocation operation comprises performing a memory resource allocation operation selected from the available options of:
  allocating a memory resource when the memory resource allocation request is a read request, wherein allocating a memory resource involves:
    identifying a read pointer in the pool-specific configuration record;
    returning a memory resource address that is read from the resource list at a location that is specified by the read pointer;
    advancing the read pointer to a next node in the resource list; and
    updating the read pointer in the pool-specific configuration record with the advanced read pointer; and
  deallocating a memory resource when the memory resource allocation request is a write request, wherein the write request includes a memory resource address in a data register of the memory mapped register interface and deallocating a memory resource involves:
    identifying a write pointer in the pool-specific configuration record;
    writing the memory resource address from the data register of the memory mapped register interface to the resource list at a location that is specified by the write pointer;
    advancing the write pointer to a next node in the resource list; and
    updating the write pointer in the pool-specific configuration record with the advanced write pointer.

10. The method of claim 1, wherein the memory resource allocation request is a read or write request that is held in the address register of the memory mapped register interface and the read or write request includes a read or write instruction, respectively, a resource identifier, and an offset and wherein the pool-specific configuration record is accessed using the read or write instruction, the resource identifier, and the offset.

11. The method of claim 10, wherein the offset has page resolution.

12. The method of claim 10, further comprising using data in the offset to perform the memory resource allocation operation.

13. The method of claim 1, wherein:
  reading a pool-specific configuration record involves reading a feature field from the pool-specific configuration record; and
  performing the memory resource allocation operation using the pool-specific configuration record involves performing the memory resource allocation operation in response to a value in the feature field.

14. The method of claim 1, further comprising maintaining a count in memory that corresponds to the pool-specific configuration record, wherein the memory resource allocation request is a write request, and further comprising implementing the write request only when the count indicates that the memory resource is not allocated to any other entity.

15. The method of claim 1, further comprising serially processing received memory resource allocation requests at the memory mapped register interface.

16. A system for memory resource allocation, the system comprising:
  an array of memory mapped pool-specific configuration records;
  random access memory (RAM) that stores resource lists that correspond to the pool-specific configuration records and that define pools of memory buffers; and
  a memory mapped register interface configured to:
    receive a memory resource allocation request;
    read a pool-specific configuration record in the array of memory mapped pool-specific configuration records according to the memory resource allocation request;
    perform a memory resource allocation operation to service the memory resource allocation request, wherein performing the memory resource allocation operation involves interacting with a resource list according to a pointer in the pool-specific configuration record;
    advance the pointer after the interaction; and
    update the pointer in the pool-specific configuration record with the advanced pointer;
    wherein the memory mapped register interface is implemented in hardware circuits, the memory mapped register interface including an address register implemented in hardware circuits to receive a component of the memory resource allocation request.

17. The system of claim 16, wherein the array of memory mapped pool-specific configuration records are stored in hardware registers and wherein the memory mapped register interface is configured to generate a physical memory address in the hardware registers from a value in the address register in order to read the pool-specific configuration record from the hardware registers.

18. The system of claim 16, wherein the array of memory mapped pool-specific configuration records are stored in random access memory (RAM) and wherein the memory mapped register interface is configured to generate a physical memory address in the RAM from a value in the address register in order to read the pool-specific configuration record from the RAM.

19. The system of claim 18, wherein the memory mapped register interface includes a data register configured to receive another component of the memory resource allocation request and wherein the memory mapped register interface is configured to perform the memory resource allocation operation by writing a memory buffer address from the data register in the memory mapped register interface to the resource list according to a write pointer in the pool-specific configuration record.

20. The system of claim 16, wherein the pool-specific configuration records include a base address of the resource list, a read pointer to the resource list, and a write pointer to the resource list.

21. The system of claim 16, wherein the pool-specific configuration records include a base address of the resource list, a read pointer to the resource list, a write pointer to the resource list, and at least one feature associated with the pool of memory buffers.

22. The system of claim 16, wherein the memory mapped register interface includes:
a data register to hold a data component of the memory resource allocation request; and
allocator logic configured to:
allocate a memory resource when the memory resource allocation request is a read request by:
reading a pool-specific configuration record in the array of memory mapped pool-specific configuration records according to an address in the address register;
returning a memory resource address that is read from the resource list at a location that is specified by the pointer, which is a read pointer;
advancing the read pointer to a next node in the resource list; and
updating the read pointer in the pool-specific configuration record with the advanced read pointer; and
deallocate a memory resource when the memory resource allocation request is a write request by:
reading a pool-specific configuration record in the array of memory mapped pool-specific configuration records according to an address in the address register;
writing a memory resource address, which is held in the data register, to the resource list at a location that is specified by the pointer, which is a write pointer;
advancing the write pointer to a next node in the resource list; and
updating the write pointer in the pool-specific configuration record with the advanced write pointer.

23. The system of claim 16, wherein:
reading a pool-specific configuration record involves reading a feature field from the pool-specific configuration record; and
performing the memory resource allocation operation using the pool-specific configuration record involves performing the memory resource allocation operation in response to a value in the feature field.

24. The system of claim 16, further comprising a count that is maintained in memory and that corresponds to the pool-specific configuration record, wherein the memory resource allocation request is a write request, and wherein the memory mapped register interface is further configured to implement the write request only when the count indicates that the memory resource is not allocated to any other entity.

25. The system of claim 16, wherein the memory mapped register interface is configured to serially process received memory resource allocation requests.

26. A system for memory resource allocation, the system comprising:
random access memory (RAM) that stores:
an array of memory mapped pool-specific configuration records; and
resource lists that correspond to the pool-specific configuration records and that each define a pool of memory buffers; and
a memory mapped register interface implemented in hardware circuits that includes:
an address register and a data register to receive a memory resource allocation request;
allocator logic configured to:
read a pool-specific configuration record in the array of memory mapped pool-specific configuration records according to a value in the address register;
perform a memory resource allocation operation to service the memory resource allocation request, wherein performing the memory resource allocation operation involves interacting with a resource list according to a pointer in the pool-specific configuration record;
advance the pointer after the interaction; and
update the pointer in the pool-specific configuration record that is stored in the RAM with the advanced pointer.

27. The system of claim 26, wherein the address register is configured to receive a component of the memory resource allocation request and wherein the memory mapped register interface is configured to generate a physical memory address in the RAM from a value in the address register in order to read the pool-specific configuration record from the RAM.

28. The system of claim 27, wherein the allocator logic is configured to:
allocate a memory resource when the memory resource allocation request is a read request by:
returning a memory resource address that is read from the resource list at a location that is specified by the pointer, which is a read pointer;
advancing the read pointer to a next node in the resource list; and
updating the read pointer in the pool-specific configuration record that is stored in the RAM with the advanced read pointer; and
deallocate a memory resource when the memory resource allocation request is a write request by:
writing a memory resource address from the data register to the resource list at a location that is specified by the pointer, which is a write pointer;
advancing the write pointer to a next node in the resource list; and
updating the write pointer in the pool-specific configuration record that is stored in the RAM with the advanced write point.

* * * * *